US006438737B1

(12) United States Patent
Morelli et al.

(10) Patent No.: US 6,438,737 B1
(45) Date of Patent: Aug. 20, 2002

(54) RECONFIGURABLE LOGIC FOR A COMPUTER

(75) Inventors: John Morelli, South Bend; H. Richard Kendall, Mishawaka, both of IN (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/505,059

(22) Filed: Feb. 15, 2000

(51) Int. Cl.[7] ........................ G06F 17/50; H03K 17/693
(52) U.S. Cl. ........................................................ 716/16
(58) Field of Search ......................... 716/16; 326/38–40

(56) References Cited

U.S. PATENT DOCUMENTS

| | | | |
|---|---|---|---|
| 5,036,473 A | 7/1991 | Butts et al. ................. 364/489 |
| 5,230,057 A | 7/1993 | Shido et al. ................ 395/800 |
| 5,243,238 A | 9/1993 | Kean ......................... 307/465 |
| 5,336,950 A | 8/1994 | Popli et al. ................. 307/465 |
| 5,535,342 A | 7/1996 | Taylor ....................... 395/307 |
| 5,537,654 A | 7/1996 | Bedingfield et al. ........ 395/834 |
| 5,600,263 A | 2/1997 | Trimberger et al. .......... 326/39 |
| 5,600,845 A | * 2/1997 | Gilson ........................ 712/39 |
| 5,628,028 A | 5/1997 | Michelson .................. 395/828 |
| 5,646,545 A | 7/1997 | Trimberger et al. .......... 326/38 |
| 5,673,198 A | 9/1997 | Lawman et al. ............ 364/489 |
| 5,689,195 A | * 11/1997 | Cliff et al. .................... 326/41 |
| 5,692,159 A | 11/1997 | Shand ........................ 395/500 |
| 5,737,766 A | 4/1998 | Tan ............................. 711/170 |
| 5,742,180 A | 4/1998 | DeHon et al. ................ 326/40 |
| 5,744,980 A | * 4/1998 | McGowan et al. .......... 326/40 |
| 5,760,607 A | 6/1998 | Leeds et al. ................. 326/38 |
| 5,794,164 A | 8/1998 | Beckert et al. ............... 701/1 |
| 5,796,977 A | 8/1998 | Sarangdhar et al. ........ 395/406 |
| 5,801,547 A | * 9/1998 | Kean ............................. 326/40 |
| 5,808,942 A | * 9/1998 | Sharpe-Geisler ....... 365/189.08 |
| 5,828,229 A | * 10/1998 | Cliff et al. .................... 326/40 |
| 5,828,858 A | 10/1998 | Athanas et al. ............. 395/311 |

(List continued on next page.)

OTHER PUBLICATIONS

M. Lehky et al., Reducing FPGA Design Modification Time, Proceeding of VHDL Users' Forum, pp. 143–149, Oct. 1997.*

I. Skliarova et al., Exploiting FPGA–based Architectures and Design Tools for Problems of Reconfigurable Computations, Integrated Circuits and Systems Design. Proceedings. pp. 347–352. Sep. 2000.*

(List continued on next page.)

Primary Examiner—Matthew Smith
Assistant Examiner—A. M. Thompson
(74) Attorney, Agent, or Firm—Blakely, Sokoloff, Taylor & Zafman LLP

(57) ABSTRACT

A system is disclosed including a reconfigurable logic circuit having programmable logic, a first memory, and a second memory. The first memory stores a number of logic designs each operable to configure the programmable logic. Also included is a computer coupled to the reconfigurable logic circuit that concurrently executes one or more application programs and an interface program. The application programs generate a number of requests to utilize the reconfigurable logic circuit and the interface program responds to the requests by opening a number of coexisting program interfaces. These interfaces each correspond to an instance of one of the logic designs stored in the first memory. The reconfigurable logic circuit is responsive to the interface program to provide a number of interface buffers in the second memory that each belong to a corresponding one of the interfaces and are each operable to store data passing between the computer and the reconfigurable logic circuit.

65 Claims, 12 Drawing Sheets

U.S. PATENT DOCUMENTS

| | | | | |
|---|---|---|---|---|
| 5,831,448 | A | | 11/1998 | Kean .............................. 326/41 |
| 5,838,165 | A | * | 11/1998 | Chatter ......................... 326/38 |
| 5,838,954 | A | | 11/1998 | Trimberger ................. 395/500 |
| 5,857,109 | A | | 1/1999 | Taylor ......................... 395/800 |
| 5,892,962 | A | | 4/1999 | Cloutier ................. 395/800.16 |
| 5,915,123 | A | * | 6/1999 | Mirsky et al. ................. 712/16 |
| 5,933,023 | A | * | 8/1999 | Young ......................... 326/40 |
| 5,946,219 | A | | 8/1999 | Mason et al. ................. 364/489 |
| 5,956,518 | A | | 9/1999 | DeHon et al. ......... 395/800.15 |
| 5,970,254 | A | | 10/1999 | Cooke et al. .......... 395/800.37 |
| 5,970,439 | A | | 10/1999 | Levine et al. ............... 702/186 |
| 5,978,260 | A | | 11/1999 | Trimberger et al. ........ 365/182 |
| 5,978,862 | A | | 11/1999 | Kou et al. ..................... 710/14 |
| 6,011,740 | A | | 1/2000 | Trimberger ................. 365/221 |
| 6,026,230 | A | * | 2/2000 | Lin et al. ...................... 703/13 |
| 6,026,459 | A | | 2/2000 | Huppenthal ................. 710/116 |
| 6,028,445 | A | * | 2/2000 | Lawman ...................... 326/38 |
| 6,052,773 | A | * | 4/2000 | DeHon et al. ................ 712/43 |
| 6,064,676 | A | * | 5/2000 | Slattery et al. ............. 370/412 |
| 6,076,152 | A | | 6/2000 | Huppenthal et al. .......... 712/15 |
| 6,127,843 | A | * | 10/2000 | Agrawal et al. .............. 326/40 |
| 6,134,516 | A | * | 10/2000 | Wang et al. ................... 703/27 |
| 6,150,839 | A | * | 11/2000 | New ........................... 326/40 |
| 6,172,520 | B1 | * | 1/2001 | Lawman et al. .............. 326/38 |
| 6,172,521 | B1 | * | 1/2001 | Motomura .................... 326/40 |
| 6,175,247 | B1 | * | 1/2001 | Scalera et al. ................. 326/39 |
| 6,340,897 | B1 | * | 1/2001 | Lytle et al. .................... 326/40 |
| 6,216,191 | B1 | * | 4/2001 | Britton et al. .............. 710/129 |
| 6,219,785 | B1 | * | 4/2001 | Smith ............................ 713/1 |
| 6,230,307 | B1 | * | 5/2001 | Davis et al. .................. 716/16 |
| 6,237,054 | B1 | * | 5/2001 | Freitag, Jr. ................... 710/72 |
| 6,255,849 | B1 | * | 7/2001 | Mohan ........................ 326/41 |
| 6,259,271 | B1 | * | 7/2001 | Couts-Martin et al. ....... 326/40 |
| 6,266,760 | B1 | * | 7/2001 | DeHon et al. ................ 712/15 |
| 6,281,703 | B1 | * | 8/2001 | Furuta et al. .................. 326/40 |
| 6,292,021 | B1 | * | 9/2001 | Furtek et al. ................. 326/41 |
| 6,298,319 | B1 | * | 10/2001 | Heile et al. .................... 703/26 |
| 6,308,311 | B1 | * | 10/2001 | Carmichael et al. .......... 716/16 |
| 6,311,149 | B1 | * | 10/2001 | Ryan et al. .................... 703/21 |
| 6,312,381 | B1 | * | 11/2001 | Knell et al. .................. 600/437 |
| 6,321,369 | B1 | * | 11/2001 | Heile et al. ................... 716/11 |
| 6,324,672 | B1 | * | 11/2001 | Lawman et al. ................ 716/1 |
| 6,338,112 | B1 | * | 1/2002 | Wipfel et al. ............... 710/269 |
| 6,339,341 | B1 | * | 1/2002 | Fujii et al. ..................... 326/38 |
| 6,339,819 | B1 | * | 1/2002 | Huppenthal et al. .......... 712/16 |
| 6,356,109 | B1 | * | 3/2002 | Furuta et al. ................. 326/41 |
| 2001/0010057 | A1 | * | 7/2001 | Yamada ....................... 709/203 |
| 2001/0047465 | A1 | * | 11/2001 | Liu .............................. 712/43 |

OTHER PUBLICATIONS

Tom Shandley et al., Pentium Pro and Pentium II System Architecture, Second Edition, pp. 11–20, Feb., 1998.*

V. Sklyarov et al., Design of Virtual Digital Controllers Based on Dynamically Reconfigurable FPGAs, Proceedings of 24$^{th}$ Euromicro Conference, pp. 200–203, Aug. 1998.*

R.W Hartenstein et al.; "A General Approach in System Design Integrating Reconfigurable Accelerators"; International Conference on Innovative Systems in Silicon; Austin TX; 1996 Proceedings.*

Maya Gokhale, Bill Holmes and Kenlobt; "Processing in Memory:The Terasys Massively Parallel PIM Array"; Computer Innovative Technology for Computer Professionals; Maryland, Apr. 1995.*

Implementing PhotoShop™ Filters in Virtex™, Ludwig, Slous, Singh, Compaq Systems Research Center, Palo Alto, CA (Dated at least as early as Feb. 1, 2000).

Accelerating Adobe Photoshop with Reconfigurable Logic, Singh, Slous, Xilinx, Inc., San Jose, CA (Dated at least as early as Feb. 1, 2000).

Accelerating DTP with Reconfigurable Computing Engines, Macvicar and Singh, Dept. Computing Science, The University of Glasgow, UK (dated at least as early as Feb. 1, 2000).

Xilinx Online—Photoshop Internet Reconfigurable Logic (IRL) Reference Design, Website (dated as least as early as Feb. 1, 2000).

Xilinx Online—Virtex Series FPGAs, Website (dated as least as early as Feb. 1, 2000).

PCI Pamette V1, Compaq Digital Products and Services (dated at least as early as Feb. 1, 2000).

Figuring Out Reconfigurable Logic, EDN, Aug. 5, 1999.

A Family of Reconfigurable Computing Engines, Wildfire™, Jan., 1999.

Wildstar™, Virtex™—COTS High Speed DSP Board Performs 11.8 GFLOPS/Board VME64X, Compact PCI and PCI Buses, Annapolis Micro Systems, Inc. (dated at least as early as Jan. 2000).

BlueICE SDI Video, Integrated Computing Engines, Inc. (dated at least as early as Feb. 1, 2000).

M.I.T. Transit Project, Transit Note #95, Unifying FPGAs and SIMD Arrays, Bolotski, DeHon, Knight, Jr., Sep. 1993.

M.I.T. Transit Project, Transit Note #100, DPGA–Coupled Microprocessors: Commodity ICs for the Early 21$^{st}$ Century, Andre DeHon, Jan., 1994.

Steven Casselman, "Virtual Computing and The Virtual Computer," Virtual Computer Corporation, Reseda, CA. (1993).

Mike Thornburg and Steven Casselman, "Transformable Computers," Virtual Computer Corporation, Reseda, CA. (1994).

Steven Casselman, Michael Thornburg, John Schewel, "Hardware Object Programming on the EVC1: a Reconfigurable Computer," Reseda, CA. (1995).

John Schewel, "A Hardware/Software Co–Design System using Configurable Computing Technology," Virtual Computer Corporation, Reseda, CA. (1998).

Steve Casselman, "Reconfigurable Logic Based Fibre Channel Network Card," Virtual Computer Corporation, Reseda, CA. (1996).

H.A. Chow, H. Alnuweiri, S. Casselman. "FPGA–Based Transformable Computers for Fast Digital Signal Processing," Steve Casselman, Napa, CA., (1995).

The Software Is the Computer, World Wide Web URL: www.vcc.com., (Date Unknown).

Algotronix consulting, World Wide Web URL: www.algotronix.com., (1998).

RRAN: The Run–Time Configuration Artificial Neural Network, Eldredge, Hutchings, IEEE, pp. 77–80, 1994 Custom Integrated Circuits Conference.

Applications of Reconfigurable Logic, Fawcett, pp. 57–69, 1994 Abingdon EE&CS Books.

Dynamic Reconfiguration of FPGAs, Department of Electronic and Electrical Engineering, Universy of Strathclyde, Glasgow; Lysaght, Dunlop, pp. 82–94, 1994 Abingdon EE&CS Books.

An FPGA–based Hardware Accelerator for Image Processing, Ross, Vellacott, Turner, pp. 299–306, 1994 Abingdon EE&CS Books.

The Design and Implementation of a Context Switching FPGA, Sanders—A Lockheed Martin Company, Scalera, Vazquez, pp. 78–84, IEEE 1998.

ASIC Design Flexibility with ERAa, Electronic Product Design, Oct. 1989.

A 3.8ms Latency Correlation Tracker for Active Mirror Control Based on a Reconfigurable Interface to a Standard Workstation and Active Mirror Control System Implementation, Shand, Weis, Scharmer, SPIE vol. 2607 (1995).

Duncan A. Buell, Jeffrey M. Arnold & Walter J. Klienfelder; Splash 2 FPGAs in a Custom Computing Machine, Chapter 1, Custom Computing Machines: An Introduction; Los Alamitos, California; 1996.

Hyun–Kyu Yun, Harvey F. Silverman; A Distributed Memory MIMD Multi–Computer with Reconfigurable Custom Computing Capabilties; Providence, Rhode Island; 1997.

* cited by examiner

RECONFIGURABLE LOGIC FOR A COMPUTER

BACKGROUND OF THE INVENTION

The present application relates to computing systems, and more particularly, but not exclusively, is directed to reconfigurable logic for accelerating performance of a computer. Additionally or alternatively, it is envisioned that the present invention may be directed to other applications and technologies.

Programmable Logic Devices (PLDs) have been developed to facilitate testing and modification of a digital logic design before committing it to mass production. Because these devices fill a unique gap between software data processing and dedicated hardware data processing, some have attempted to augment existing computer systems by installing an input/output (I/O) module with a software accessible programmable logic device. Typically, these modules support only one software application. Moreover, these I/O modules tend to communicate too slowly with the system processor to be of practical benefit for many implementations that would otherwise be desirable. Reference is made to U.S. Pat. Nos. 5,978,862 to Kou, et al.; 5,857,109 to Taylor; 5,692,159 to Shand; 5,535,342 to Taylor; and 5,036,473 to Butts et al. for more background information on these arrangements.

On another front, Field Programmable Gate Array (FPGA) integrated circuit development has begun to focus on single-chip, multiple context arrangements. U.S. Pat. Nos. 6,011,740 to Trimberger; 5,978,260 to Trimberger et al.; 5,956,518 to DeHon et al.; 5,915,123 to Mirsky et al.; 5,838,954 to Trimberger; 5,838,165 to Chatter; 5,646,545 to Trimberger et al.; and 5,600,263 to Trimberger et al. provide further information regarding these types of chips. Despite these efforts, challenges remain concerning how to implement these more complicated designs. These challenges are especially acute in relation to interfacing these complex devices with standard computing systems and management of the devices with such systems.

Thus, there is a need for further contributions in this area of technology.

SUMMARY OF THE INVENTION

One form of the present invention is a unique computing system. Other forms include unique systems and methods for reconfiguring programmable logic. Further forms include unique techniques for interfacing with a reconfigurable logic circuit. In still a further form, a unique apparatus with reconfigurable logic is provided. Yet other forms, embodiments, objects, advantages, benefits, features, and aspects of the present invention will become apparent from the detailed description and drawings contained herein.

DETAILED DESCRIPTION OF THE SELECTED EMBODIMENTS

Figure 1:
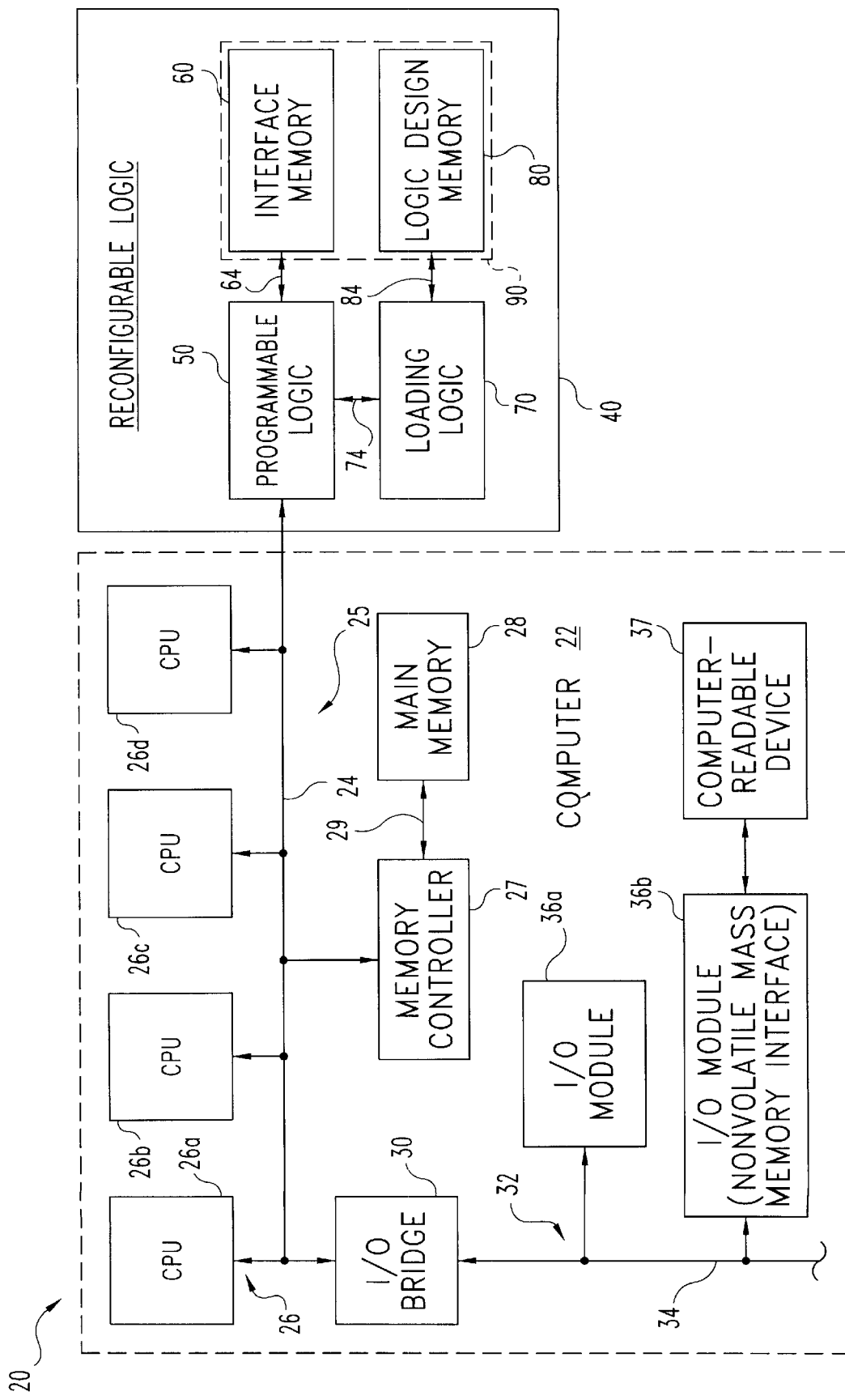
FIG. 1 is a diagrammatic view of a computing system with reconfigurable logic.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 is a diagrammatic view of computing system 20 of one embodiment of the present invention. System 20 includes computer 22. Computer 22 includes processor bus 24 arranged to operatively couple together a cluster 25 of Central Processing Units (CPUs) 26a, 26b, 26c, 26d, four (4) of which are depicted (collectively designated processors 26). For one embodiment, cluster 25 includes up to four (4) PENTIUM II microprocessors supplied by Intel Corporation, and processor bus 24 is of a type suitable to interconnect a PENTIUM II microprocessor cluster. Reference is made to: Tom Shanley, *Pentium Pro and Pentium II System Architecture,* (2d ed., Addison-Wesley Books, 1998) as a source of more information for this type of processor cluster and bus arrangement, and is hereby incorporated by reference. In another embodiment, one or more PENTIUM III microprocessors from Intel Corporation are utilized with a correspondingly arranged processor bus 24. In still other embodiments, more processors or as few as one processor may be utilized. Also, one or more processors of other types and from other manufacturers can be used. In one alternative, computer 22 has only a single processor and processor bus 24 is of a noncluster type. Furthermore, it should be understood that processors or CPUs of the present invention may include one or more components and that processor bus 24 may include one or more components to manage its operation.

Computer 22 also includes memory controller 27 coupled to processor bus 24. Memory controller 27 operatively couples main memory 28 to processor bus 24 via memory bus 29. Memory controller 27 manages access to main memory 28 over processor bus 24, and may be in the form of one or more dedicated components or part of one or more other components of system 20. Main memory 28 may be comprised of one or more components of the volatile or nonvolatile type and may vary in size. For a typical PENTIUM II arrangement of cluster 25, main memory 28 is typically of the Dynamically Random Access Memory (RAM) type; however, other arrangements of main memory 28 may be utilized with or without a PENTIUM II arrangement for cluster 25.

Computer 22 also includes Input/Output (I/O) subsystem 32. Subsystem 32 includes I/O bridge 30 operatively coupled to processor bus 24. I/O bridge 30 is also operatively coupled to I/O bus 34. I/O bridge 30 serves as a communication link between processor bus 24 and I/O bus 34, providing buffering, reformatting, arbitration, and/or other operations to facilitate desired communications between the buses. I/O bus 34 operatively connects one or more I/O devices to processor bus 24 via I/O bridge 30. Two I/O modules 36a, 36b are depicted in FIG. 1 (collectively designated modules 36). It should be appreciated that more or fewer I/O modules 36 may be coupled to I/O bus 34. In one implementation, I/O bridge 30 and memory controller 27 are provided in a combined form as a single component or dedicated set of components to manage I/O and main memory transactions with processor bus 24. Computer 22 can alternatively or additionally include one or more other I/O bridges coupled to I/O bus 34 and/or processor bus 24 to correspondingly provide further I/O buses of the same or different types. In other embodiments, distinct I/O bridges and/or I/O buses are absent.

For one embodiment with a PENTIUM II arrangement of cluster 25, I/O bus 34 is of a standard Peripheral Component Interconnect (PCI) local bus type. In this embodiment, the bandwidth of I/O bus 34 is less than the bandwidth of processor bus 24; where bandwidth is the product of the data width of the given bus and the bus speed (usually in terms of frequency). Also, latency time for a data transfer between different agents on processor bus 24 is typically less than the latency time for a data transfer between one of the devices on processor bus 24 and one of the devices on I/O bus 34 for this embodiment. As used herein, "latency time" means a measure of time from a request by a first device to receive data from a second device to the start of receipt of that data by the first device from the second device in response to the request (usually in terms of bus cycles). Accordingly, the "total transfer time" for a data block is a function of latency time, and the product of the bandwidth and data block size, which is typically less for transfers between devices on processor bus 24 than transfers between a device on processor bus 24 and a device on I/O bus 34.

This embodiment can also include one or more additional I/O bridges to other I/O buses coupled to processor bus 24. Alternatively or additionally, an I/O bridge can be provided to couple an I/O bus of the PCI type to other varieties, such as the Industry Standard Architecture (ISA) and/or the Extended Industry Standard Architecture (EISA) type. In one particular instance of a PENTIUM II-based embodiment, an additional EISA-type I/O bridge is coupled to a PCI form of I/O bus 34 to provide an EISA extension of I/O bus 34, and an Advanced Programmable Interrupt Controller (APIC) bus is connected to processors 26 and an I/O APIC module that is connected to the additional EISA bridge. Furthermore, in other embodiments, different I/O bridges and/or I/O bus types may be utilized for I/O subsystem 32 either with or without a PENTIUM II processor cluster as would occur to those skilled in the art.

I/O module 36b is further designated as a nonvolatile mass memory interface. This interface is for a permanently installed and/or a portable computer-readable device 37, as schematically depicted in FIG. 1. Device 37 can be of the electromagnetic, optical, semiconductor, and/or other variety as would occur to those skilled in the art. For example, device 37 can be an optically encoded Compact Disk (CD) or Digital Video Disk (DVD) of the read only or read/write type; an electromagnetic hard drive disk, portable floppy drive disk, tape, or bubble memory cartridge; and/or a nonvolatile semiconductor cartridge or card of the Programmable Read Only Memory (PROM), Erasable Programmable Read Only Memory (EPROM), Electrically Erasable Read Only Memory (EEROM), flash, and/or Static Random Access Memory (SRAM) type with portable back up power, just to name a few. In one embodiment, I/O module 36a and device 37 collectively designate a PCI/ISA/IDE accelerator component and Integrated Drive Electronics (IDE) hard drive unit.

Computer 22 is coupled to reconfigurable logic circuit 40 by processor bus 24. Reconfigurable logic circuit 40 includes programmable logic 50. As used herein, "programmable logic" refers broadly to any form of hardware logic that may be programmed more than once, including, but not limited to, one or more Programmable Logic Devices (PLDs), Field Programmable Gate Arrays (FPGAs), and/or Dynamically Programmable Gate Arrays (DPGAs), to name only a few. Programmable logic 50 is coupled to interface memory 60 by memory bus 64 and design loading logic 70 by bus 74. Design loading logic 70 is coupled to logic design memory 80 by bus 84. Interface memory 60 and logic design memory 80 are collectively designated local memory 90. In one embodiment, reconfigurable logic circuit 40 is provided as a unit with a connector to removably interface to processor bus 24 of computer 22. For this embodiment, the one or more components comprising reconfigurable logic circuit 40 may be mounted to a common printed wiring board with a plugable card edge connector. For multiple component embodiments of reconfigurable logic circuit 40, such components may be mounted on more than one printed wiring board or card, or otherwise be distributed throughout system 20. Indeed, reconfigurable logic circuit 40 may be provided as a permanently installed subsystem on a mother board shared with various components of computer 22. Accordingly, reconfigurable logic circuit 40 alternatively may be considered an integral part of computer 22.

Figure 2:
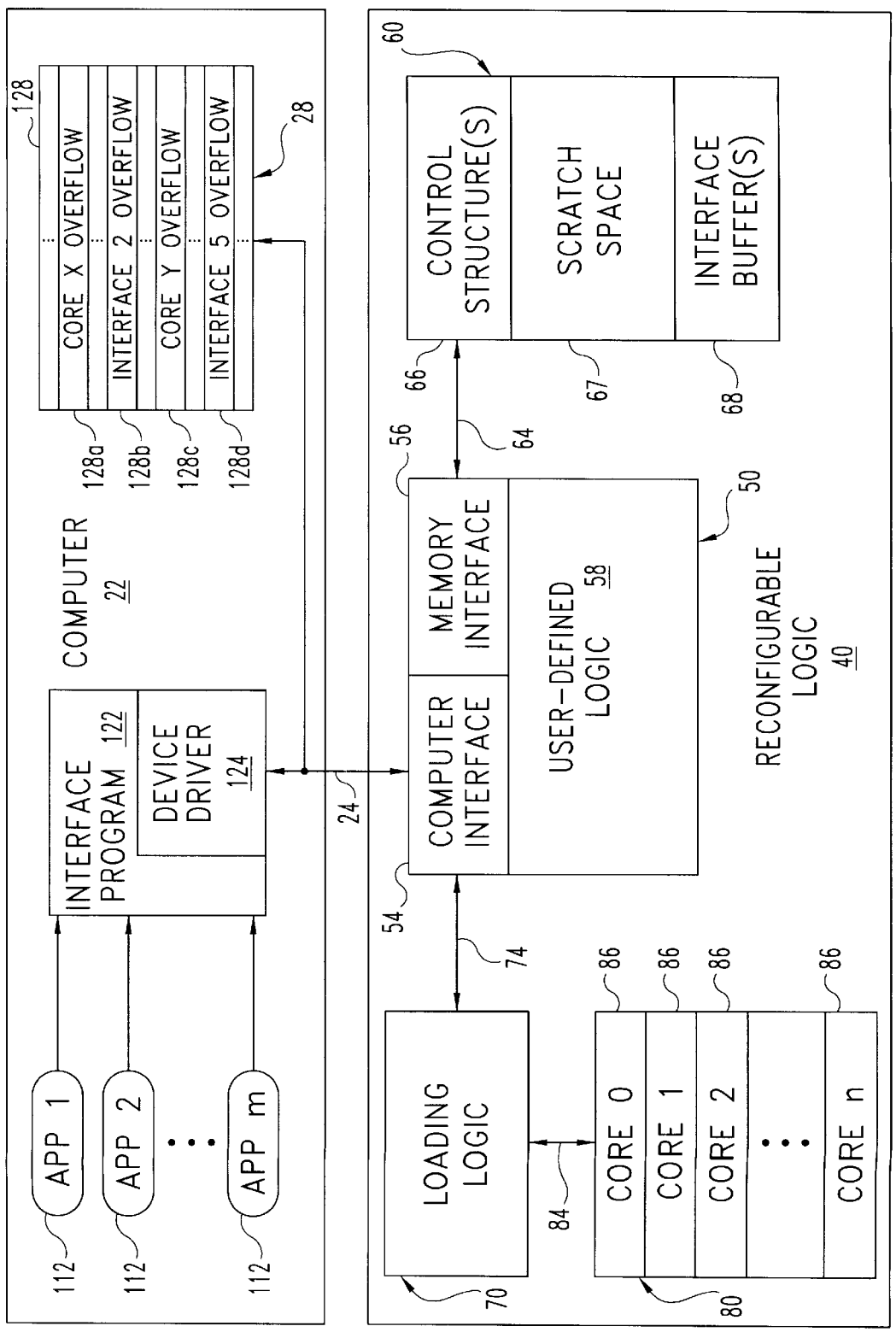
FIG. 2 is a diagrammatic view depicting further details of a portion of the system of FIG. 1.

Referring additionally to FIG. 2, further details of reconfigurable logic circuit 40 are described. Programmable logic 50 is provided with computer interface logic portion 54, memory interface logic portion 56, and user-defined programmable logic portion 58. Preferably, programmable logic 50 is comprised of one or more FPGA devices of the volatile type, such as those manufactured by Xilinx or Altera; however, one or more other device types or a combination of different device types may comprise programmable logic 50. For volatile configurations of programmable logic 50, computer interface logic portion 54 and/or memory interface logic portion 56 can be programmed as part of an initialization operation when power or a reset signal is applied to reconfigurable logic circuit 40 as more fully described hereinafter in connection with FIG. 3.

Computer interface logic portion 54 of programmable logic 50 is operatively coupled to processor bus 24 to provide a direct, two-way communication pathway with one or more of processors 26 of computer 22. Computer interface logic portion 54 is also operatively coupled to design loading logic 70 by bus 74. Because of the bus 84 connection of design loading logic 70 to logic design memory 80, information can be communicated between computer 22 and logic design memory 80 via computer interface logic portion 54 and design loading logic 70. Logic design memory 80 is arranged to store a number of core logic designs 86 in memory 80, a few of which are individually designated in FIG. 2 as Core 0, Core 1, Core 2, . . . , and Core n; where "n" is the total number of core logic designs stored. Designs 86 can be initially provided to logic design memory 80 from computer 22. Designs 86 each provide a different configuration of user-defined logic portion 58. Design loading logic 70 is responsive to appropriate signals or commands to load a selected one of the stored logic designs 86 into programmable logic 50 via bus 84 and 74. One or more designs 86 in memory 80 can be scheduled for application to programmable logic 50.

Memory interface logic portion 56 of programmable logic 50 provides a communication pathway from interface memory 60 to computer 22 and user-defined logic portion 58. Interface memory 60 is dynamically allocated to include one or more control structures 66, scratch memory space 67, and one or more interface buffers 68. For each scheduled or active design 86, one of control structures 66 and one or more corresponding interface buffers 68 are allocated to store information pertinent to interfacing between the given design 86 and computer 22. Scratch memory space 67 is available for access by user-defined logic 58.

Figure 3:
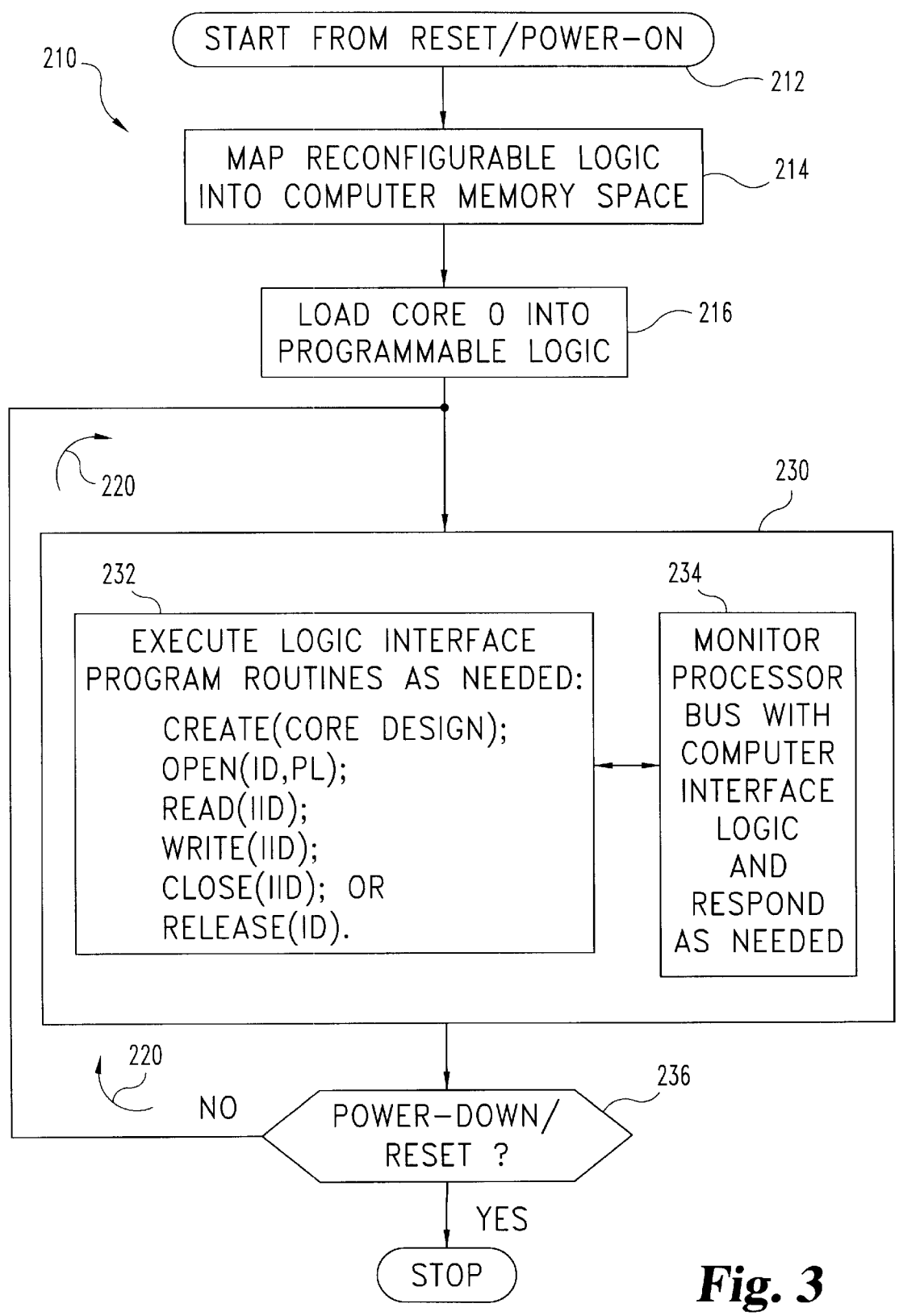
FIG. 3 is a flow chart of a process for utilizing the reconfigurable logic of the system shown in FIG. 1.

Referring additionally to FIG. 3, one technique for managing and scheduling the configuration of programmable logic 50 with logic designs 86 is described in connection with process 210 illustrated by the flow chart of FIG. 3. Process 210 starts from a reset or power-on condition 212 of system 20. From condition 212, computer 22 maps reconfigurable logic circuit 40 into a designated memory space "RL" in operation 214. In operation 216, loading logic 70 is configured to load Core 0 into programmable logic 50 from memory 80. Once loaded, Core 0 setsup reconfigurable logic circuit 40 to interface with computer 22 via processor bus 24 by defining computer interface logic portion 54 and memory interface logic portion 56 of programmable logic 50. Typically, Core 0 is a special initialization design that need not specify a user-defined logic portion 58 of programmable logic 50. It should be appreciated that for process 210, it is desirable that at least a portion of design loading logic 70 and core logic design memory 80 be of a nonvolatile type to provide for loading of computer interface logic portion 54 and memory interface logic portion 56 upon power-up. In one embodiment, loading logic 70 is provided by a nonvolatile Complex Programmable Logic Device (CPLD), a hard-wired state machine of multiple devices, or the like; and memory 80 includes one or more nonvolatile flash-type devices. It should be understood that each core logic design 86 may be arranged to configure computer interface logic portion 54 and/or memory interface logic portion 56 along with user-defined logic portion 58. Alternatively, once interface logic portions 54 and/or 56 are configured upon power-up or reset condition 212, subsequent reconfigurations of programmable logic 50 with different core logic designs 86 only alter user-defined logic portion 58. In still other embodiments, interface logic portions 54, 56 are nonvolatile, so that initial loading is not required upon power-up.

After computer interface logic portion 54 and memory interface logic portion 56 are established in operation 216, communication between computer 22 and reconfigurable logic 50 may take place over processor bus 24. For example, by accessing memory addresses in memory space RL, one or more processors 26 of computer 22 can write interface information to reconfigurable logic circuit 40, such as input data to be processed by programmable logic 50 or commands to reconfigurable logic circuit 40; and read interface information, such as processing results from programmable logic 50 or status of reconfigurable logic circuit 40. Computer 22 executes a number of application programs 112 and logic interface program 122 (see FIG. 2). Logic interface program 122 provides an upper-level interface programming layer responsive to requests by application programs 112 to utilize reconfigurable logic circuit 40. Logic interface program 122 communicates with reconfigurable logic circuit 40 through a second, lower-level programming layer in the form of device driver routine 124. Device driver routine 124 is customized to the particulars of the design for reconfigurable logic circuit 40 to convert communications from logic interface program 122 into a format recognized by reconfigurable logic circuit 40. Accordingly, for this embodiment a number of different device driver routines 124 can be alternatively utilized to interface with correspondingly different reconfigurable logic designs. These different device driver routines 124 each communicate with logic interface program 122 through a common protocol, but generally have different communication protocols peculiar to the associated reconfigurable logic design. In other embodiments, different interface program arrangements may be utilized that include the same, more, or fewer programming layers. Indeed, in one alternative embodiment, logic interface program 122 is integrally combined with device driver routine 124 to provide a single layer of logic interface programming. In other alternatives, logic interface program 122 can include multiple device drivers in the form of selectable subroutines, and/or include three or more programming layers.

In FIG. 2, application programs 112 are designated as APP 1, APP 2, . . . , and APP m; where "m" is the total number of application programs 112 undergoing concurrent execution by computer 22. As used herein, "concurrent execution" of two or more programs refers to starting and managing execution of the two or more programs by the computer at the same time, even though the computer may only perform instructions for one of the programs at a time. Concurrent execution includes, but is not limited to multitasking of two or more programs through context switching, time slicing, or another mode, and/or multiprocessing of two or more programs by simultaneously executing each program on a different CPU.

Typically, an application program 112 provides input data for processing by the programmable logic 50 with the requested core logic design 86, and programmable logic 50 processes the input data to generate corresponding output data. Management of this input and output data for each requesting application program 112 are among the tasks performed by logic interface program 122, computer interface logic portion 54, and/or memory interface logic portion 56.

For many applications, reconfigurable logic circuit 40 is utilized to accelerate a computationally intense algorithm. Such algorithms are commonly included in encryption/decryption, image processing, voice recognition or synthesis, video conferencing, and the like. By making a variety of core logic designs 86 and/or logic design instances available to application programs 112, acceleration of these and other commonly executed processes is made possible. In one embodiment, computer 22 operates with a WINDOWS-based operating system from MICROSOFT, and logic interface program 122 is arranged to provide a WINDOWS-compatible interface protocol for application programs 112. For this embodiment, logic interface program 122 provides a standard Application Program Interface (API) to communicate with application programs 112 executed under the WINDOWS operating system. Nonetheless, in other embodiments, different operating systems and/or operation system relationships to logic interface program 122 can be utilized.

After operation 216, process 210 continues with processing/monitoring loop 220. In loop 220, operation 230 includes the performance of tasks by logic program interface 122 in operations block 232 and reconfigurable logic circuit 40 in operations block 234. In operations block 232, logic interface program 122 generates various read/write accesses to memory space RL of reconfigurable logic circuit 40. Reconfigurable logic circuit 40 interprets and responds to these memory accesses in operations block 234 via computer logic interface portion 54.

As part of operation 230, logic interface program 122, computer interface logic portion 54, or a combination of these is configured to periodically switch between core logic designs 86 of logic. design memory 80 that have been scheduled to service requests from application programs 112. In one embodiment, context switching is performed by changing the configuration of programmable logic 50 from one requested core logic design 86 to next, based on the passage of a uniform time interval between each change. In another embodiment, the timing of context switching may vary depending on the core logic design and/or inputs from logic interface program 122. For example, these inputs may relate to the need for additional time to process a given core logic design that handles larger amounts of data relative to another of the core logic designs. In still another embodiment, logic interface program 122 is arranged to recognize when requests by application programs 112 can be addressed more efficiently by processing with no or limited context switching. Nonetheless, alternative embodiments may include context switching regardless of priority or other inputs. Yet other embodiments provide for multiple context switching modes and an option of no context switching as part of logic interface program 122. Indeed, in a further embodiment, logic interface program 122 is arranged to handle simultaneous processing of different core logic designs by multiple programmable logic devices 50 included in reconfigurable logic circuit 40 (not shown). Logic interface program 122 includes a scheduler routine to schedule and manage configuration of programmable logic 50 with different logic designs 86.

Even if different application program requests are for the same core logic design, logic interface program 122 instantiates a different logical or virtual program interface for each application program request because the input and/or output data for a given request typically differs. Accordingly, whether for the same or different core logic designs, each of these instantiations or "instances" is separately established and maintained by logic interface program 122. Logic interface program 122 is further arranged to determine if a given instantiation or "instance" of a logic design requires activation/loading of a new logic design or if it is already scheduled. In correspondence with this capability, instances and/or virtual program interfaces established for active instances may be modeled as "clients" and logic interface program 122/reconfigurable logic circuit 40 may be modeled as a "server" for these clients.

In one example directed to multiple instances of a common core logic design, an encryption core logic design is requested by a number of the application programs 112 that is embodied in user-defined logic portion 58 of programmable logic 50. This design partially or completely encrypts data provided to the reconfigurable logic circuit 40 and returns encrypted results to computer 22 via processor bus 24. It should be appreciated that such a core logic design might be requested a number of times by different application programs or the same application program multiple times with different input data for each request. Accordingly, logic interface program 122 tracks a separate designator for each instance; however, once the corresponding user-defined logic portion 58 is configured with the encryption logic, it need not change. Furthermore, when multiple instances of a common design are indicated along with scheduling of other designs, logic interface program 122 can be arranged to provide the option of processing each of these instances consecutively to reduce overhead that might otherwise occur due to swapping different core logic designs in and out of programmable logic 50. Nonetheless, in other embodiments, it may be more advantageous to provide context switching without adjustment for multiple instances of the same design, or to otherwise adjust allocation as would occur to those skilled in the art.

Logic interface program 122/reconfigurable logic circuit 40 provides for the allocation of overflow memory space in main memory 28 as needed to address fluctuating demands on local memory 90. FIG. 2 depicts an overflow memory space 128 with a few representative overflow segments designated by reference numerals 128a, 128b, 128c, 128d. Segments 128a, 128c represent overflow segments for core logic design programs that are further described in connection with routine 310 of FIG. 4. Segments 128b, 128d represent interface information overflows 2 and 5 that correspond to logic design instances 2 and 5 scheduled for execution by programmable logic 50. During context switching between core logic designs or logic design instances, the size of memory 60 may not be sufficient to store desired input, output, and/or state information of a context while it is deactivated. Accordingly, overflow segments 128b and 128d may be used until programmable logic 50 is again allocated to process that particular context. Nonetheless, in other embodiments, such overflow space may not be necessary or may not be allocated, instead limiting operations to available space in local memory 90 of reconfigurable logic circuit 40.

It should be understood that application programs 112 requests to utilize reconfigurable logic circuit 40 may result in a number of coexisting virtual program interfaces. Each of these virtual program interfaces communicates with reconfigurable logic circuit 40 through a set of standard routines or functions of logic interface program that treat each logic design instance in a manner comparable to a logical file. These routines are listed as part of operations block 232 in FIG. 3. Logic interface program 122 manages the virtual program interfaces in a file-like manner. Logic interface program 122 communicates these standard commands/functions through device driver routine 124. Device driver routine 124 generates each read or write access to which reconfigurable logic circuit 40 responds. Computer interface logic portion 54 of programmable logic 50 monitors processor bus 24 for an appropriate read or write access to memory space RL by device driver routine 124. If a valid access is detected, reconfigurable logic circuit 40 responds in accordance with the command, request, or data communicated by computer 22.

Operations 232, 234 are further described in terms of the tasks performed for various routines of logic interface program 122 as follows. A new core logic design is loaded into reconfigurable logic circuit 40 from computer 22 with the Create(Core Design) routine 310 as further described in connection with the flow chart of FIG. 4. Routine 310 starts with designation stage 312. From stage 312, routine 310 continues with conditional 314 that determines whether memory space is available in logic design memory 80. In one embodiment, this test is performed by logic interface program 122, which maintains a record of the amount of memory space available in logic design memory 80 since the reset or power-on condition 212. In alternative embodiments, this test may be partially or completely performed by computer interface logic portion 54 and/or design loading logic 70. If memory space is available in logic design memory 80, routine 310 continues with stage 322 to push the new logic core design into logic design memory 80 in stage 322. The execution of stage 322 includes transferring the new core logic design under the control of logic interface program 122 from main memory 128 and/or an I/O device such as computer readable device 37 to logic design memory 80 via computer interface logic portion 54, bus 74, loading logic 70, and bus 84.

Routine 310 continues with stage 324. In stage 324, logic interface program 122 assigns a unique identification (ID) for the new core logic design stored in logic design memory 80 that may be used in other routines of logic interface program 122. Routine 310 then halts, returning to operation 230 of process 210 of FIG. 3. From operation 230, process 210 continues with conditional 236. Conditional 236 tests if a power-down or reset has occurred. If a power-down or reset condition has not occurred, then loop 220 is engaged to return to operation 230 to process the next task of logic interface program 122 in operations block 232 and reconfigurable logic circuit 40 in operations block 234. If a power-down or reset condition has occurred, process 210 halts.

Figure 4:
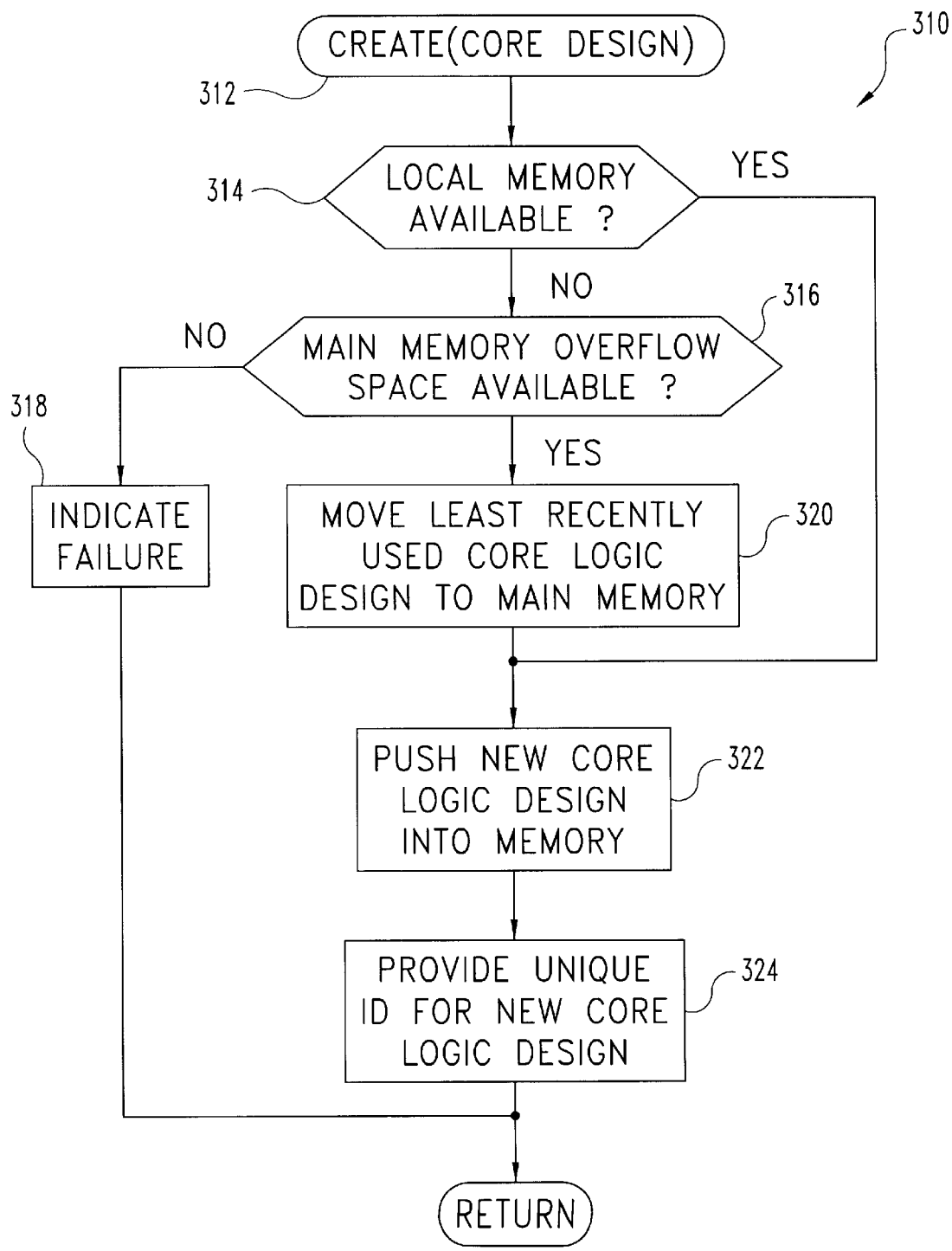
FIG. 4 is a flow chart showing further details of a "Create" routine for the process of FIG. 3.

Returning to conditional 314 of FIG. 4, if space is not available in logic memory 80, routine 310 continues with conditional 316. Conditional 316 test whether overflow memory space 128 is available in main memory 28. As depicted in FIG. 2, overflow memory space 128 includes overflow segments 128a and 128b for Core X and Core Y logic designs, respectively. If overflow space is not available, routine 310 continues with stage 318 which indicates a failure of the Create function and returns a corresponding indication. From stage 318, routine 310 halts and control returns to operation 230 of process 210.

Figure 5:
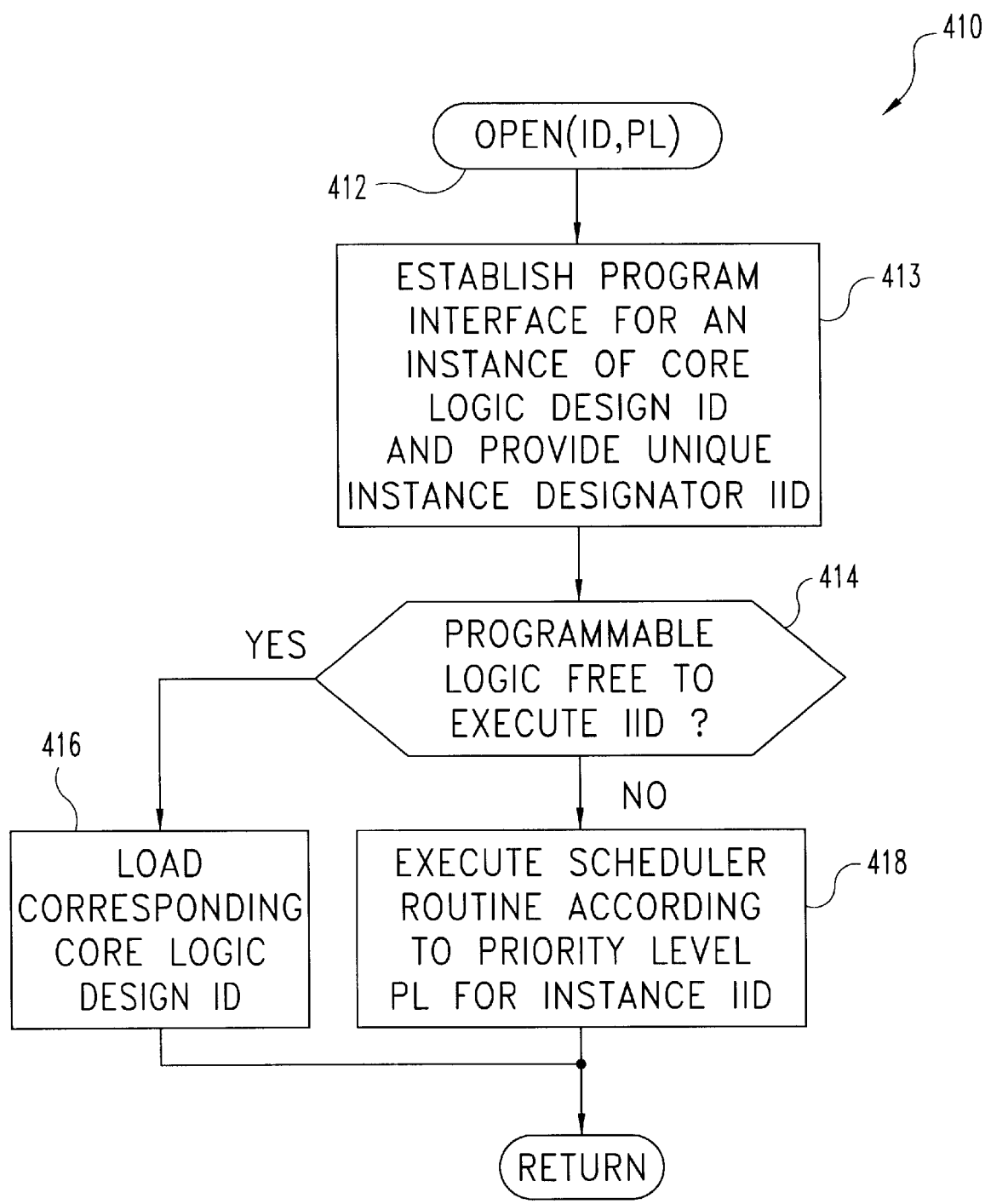
FIG. 5 is a flow chart showing further details of an "Open" routine for the process shown in FIG. 3.

If it is determined that overflow memory space is available in main memory 28, as tested by conditional 316, routine 310 continues at stage 320. In stage 320, logic interface program 122 directs the transfer of the least recently used core logic design to main memory 28. For the FIG. 2 depiction, Core X or Core Y may be such a design. The determination of which logic design was least recently used includes a reference by logic interface program 122 to interface memory 60 through memory interface logic portion 56 of programmable logic 50, as will be explained in greater detail hereinafter in connection with the flow chart of routine 410 shown in FIG. 5 and the memory diagram of FIG. 6. After stage 320, routine 310 resumes with stages 322 and 324 as described previously. Routine 310 then halts and control returns to operation 230 of process 210 as shown in FIG. 3.

Routine 310 may be repeated a number of times to provide for an appropriate loading of a number of desired core logic designs 86 in memory 80. Once a desired logic design 86 is stored in memory 80, a virtual program interface to that design is established by activating (instantiating) an instance of the logic design with the Open(ID, PL) routine 410 further described in connection with the flow chart of FIG. 5 and the memory diagram of FIG. 6. Routine 410 begins with stage 412; where 'ID' is the ID of a core logic design previously created with Create(Core Design) routine 310, and 'PL' is a selected priority level. From stage 412, routine 410 continues with stage 413 that establishes a logical/virtual program interface for an instance of core logic design ID with logic interface program 122. Stage 413 also assigns a unique instance identifier IID for that instance. After opening a program interface in stage 413, routine 410 continues with conditional 414 to test whether programmable logic 50 is available to execute the core logic design ID corresponding to the newly opened instance IID. If it is available, the core logic design specified by ID is loaded into programmable logic 50 in stage 416. If it is not available, the scheduler routine of logic interface program 122 is executed to schedule an active instance of the core logic design specified by ID according to its assigned priority level PL in stage 418. Once either stage 416 or 418 is completed, routine 410 halts and control returns to operation 230 of process 210.

Regardless of which stage 416 or 418 is executed by routine 410, core logic design ID stored in memory 80 is activated either to be immediately loaded into programmable logic 50 via loading logic 70 or scheduled for such loading. This loading process includes sending appropriate direction from logic interface program 122 via device driver routine 124 to design loading logic 70 through computer interface logic portion 54. Design loading logic 70 then transfers the appropriate core logic design 86 designated by ID via bus 84 and 74 either immediately for stage 416 or in accordance with the schedule established in stage 418. As in the case of the Create(Core Design) routine, the Open(ID) routine may be repeated a number of times to establish a number of coexisting program interfaces for different logic design instances. It should be appreciated that in other embodiments, the Create(Core Design) and Open(ID) operations may be combined into a single routine or function with or without other operations. In one form of this combined approach, a new core logic design is loaded into reconfigurable logic circuit 40, and a logic design instance instantiated in response to the routine. Subsequent attempts to load the same program instantiate a new instance, but do not reload the design.

Figure 6:
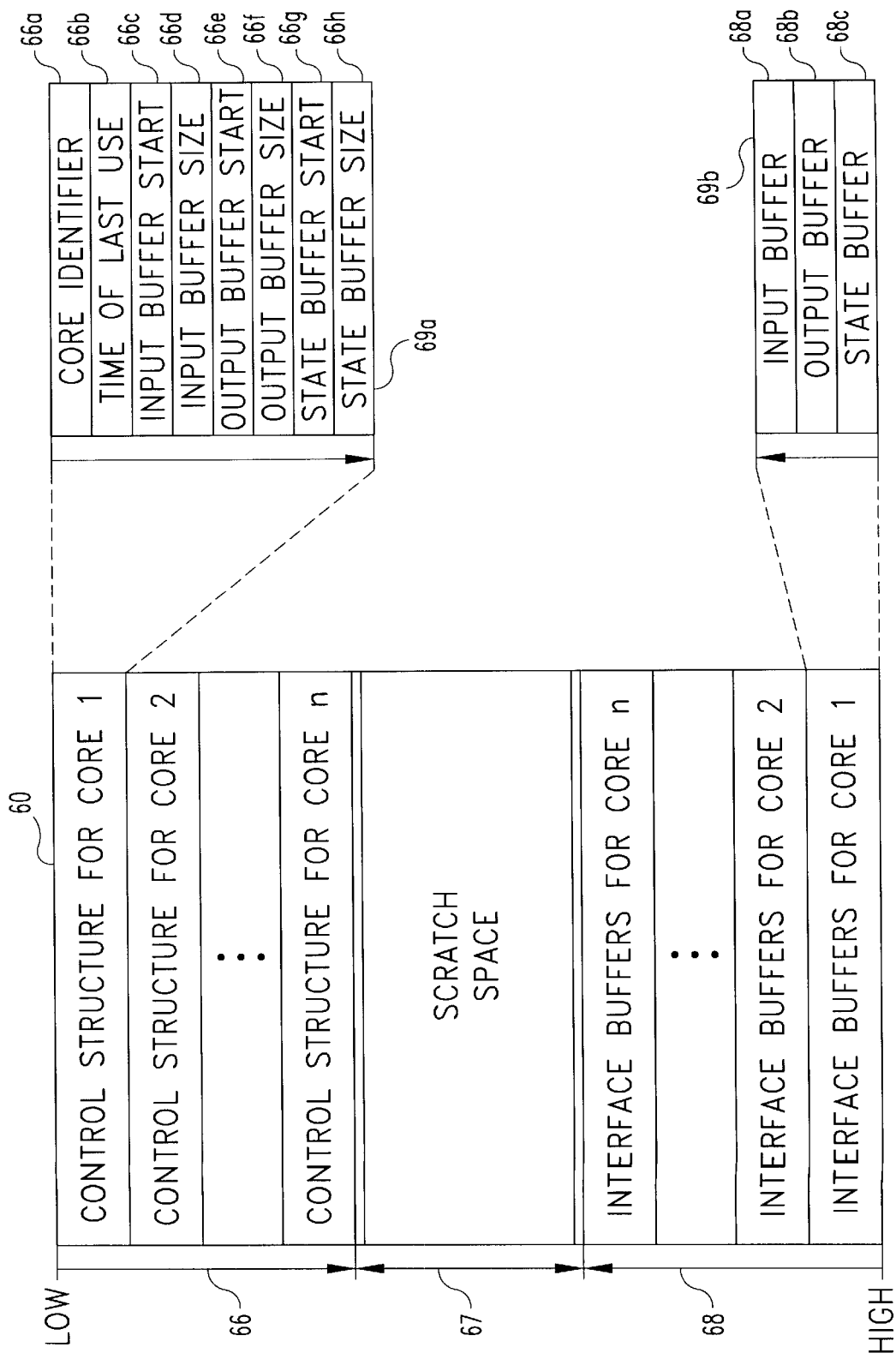
FIG. 6 is a memory allocation diagram for the interface memory shown in FIGS. 1 and 2.

Referring additionally to FIG. 6, with each establishment of an instance IID of one of core logic designs 86, logic interface program 122 also directs the establishment of a corresponding control structure 66 and interface buffer(s) 68 via computer interface logic portion 54 and memory interface logic portion 56 of programmable logic 50. Going from top to bottom, memory 60 is diagrammed from its lowest address to its highest address. For each instance IID that has been opened in accordance with routine 410, a control structure for the corresponding core logic design is added from low towards high memory; where the ellipsis between structures 66 represent like structures that are not shown to preserve clarity. From the highest address towards lower addresses of memory 60, interface control buffers 68 are allocated in sets for each instance IID of a core memory design. Again, an ellipses is shown between interface buffers 68 to represent like buffers that are not specifically illustrated to preserve clarity. Between control structures 66 and interface buffers 68, scratch memory space 67 is illustrated that dynamically changes in size depending on the number of allocated control structures 66 and interface buffers 68.

FIG. 6 illustrates in greater detail a representative control structure entry set 69a for one of the control structures 66. The entries of set 69a are arranged to store interface information for a designated Core 1 logic design (ID=Core 1). Entry 66a specifies a unique identifier to designate Core 1 as the corresponding logic design for the particular instance. Entry 66b includes data specifying the time of last use of the instance IID. The information in entry 66b can be referenced to determine which logic design is the least recently used in stage 320 of routine 310.

FIG. 6 also illustrates in greater detail a representative interface buffer set 69*b*. Interface buffer set 69*b* includes the interface buffers 68 allocated to the logic design instance IID of the Core 1 logic design with the control structure entry set 69*a*. Entry 66*c* of control structure entry set 69*a* is a pointer that specifies the starting address in interface memory 60 of input buffer 68*a* of set 69*b*. Entry 66*d* of set 69*a* specifies the size of the input buffer 68*c*. Accordingly, input buffer 68*a* is allocated through entries 66*c*, 66*d* of the corresponding control structure 66. Data is stored in input buffer 68*a* by computer 22 for processing by the requested instance IID of the Core 1 logic design via the Write(IID) function to be further described hereinafter.

Entry 66*e* of control structure entry set 69*a* is a pointer to the starting address of output buffer 68*b* of interface buffer set 69*b*. Entry 66*f* specifies the size of output buffer 68*b*. Accordingly, output buffer 68*b* is allocated through entries 66*e*, 66*f* of the corresponding control structure 66. Data is read from output buffer 68*b* by computer 22 with the Read(IID) function to be further described hereinafter. This output data includes the results obtained by processing the data in input buffer 68*a* with the Core 1 logic design for instance IID.

Entry 66*g* of control structure entry set 69*a* specifies the starting address of a state buffer 68*c* of interface buffer set 69*b*. Entry 66*h* of control structure 66*a* specifies the size of state buffer 68*c*. The state buffer may be used for the storage of intermediate results during context switching, to provide overflow for input buffer 68*a* and/or output buffer 68*b*, or as would otherwise occur to those skilled in the art.

Other control structures 66 and interface buffers 68 of memory 60 are configured like sets 69*a*, 69*b*, respectively, for each instance IID. In other embodiments, the number and type of entries for control structures 66 may vary. Likewise, the number and type of interface control buffers 68 may be different in number and type, and indeed may vary from one to the next for different core logic designs or logic design instances. In one variation, a common buffer is used by an instance IID for storing both input and output data. The allocation and storage of values in control structures 66 for each different instance IID may be performed and managed by logic interface program 22 via device driver routine 124, computer interface logic portion 54, memory interface logic portion 56, or a combination of these. Accordingly, the allocation of scratch space 67 follows from the size, location, and number of buffers defined by each of control structures 66.

Referring again to operation 230 of process 210 shown in FIG. 3, a Write(IID) function of operations block 232 is further described in connection with routine 510*a* detailed in the flow chart of FIG. 7. Write(IID) routine 510*a* is performed to provide input data from a requesting application program 112 for processing by reconfigurable logic circuit 40 via logic interface program 122 and device driver routine 124. The Write(IID) function is only performed after the corresponding instance IID has been instantiated. From the designation in stage 512*a*, routine 510*a* continues with conditional 514*a*. In conditional 514*a*, routine 510*a* tests whether the particular core logic design IID has priority for execution by the hardware of reconfigurable logic circuit 40. Such priority may be dynamic or static and may be based on one or more factors. Such factors can include, the relative priority level PL of the various active instances IID, the amount of time since a given instance IID has been given hardware priority, the degree of utilization of reconfigurable logic circuit 40, and/or the availability of a software routine alternative to name a just a few. In one form, priority is determined based on a status flag that is updated from time-to-time based one or more of these factors.

If the core logic design instance ID does have priority as tested by conditional 514*a*, routine 510*a* continues with conditional 516*a*, which tests whether the corresponding core logic design ID is loaded in programmable logic 50. If the core logic design specified by ID is not loaded, stage 518*a* is engaged which waits until the appropriate core logic design specified by ID is switched into the programmable logic 50 in accordance with the scheduler routine of logic interface program 122. Typically this wait is for the next context switch. Stage 519*a* is next encountered in which data to be processed for the Write(IID) operation is pushed into the corresponding input buffer of interface buffers 68. If the test of conditional 516*a* is affirmative, that is the desired core logic design ID is already loaded in programmable logic 50, then routine 510*a* proceeds directly to stage 519*a* from the affirmative branch of conditional 516*a*.

Routine 510*a* then resumes with a protocol test in conditional 520*a*. Conditional 520*a* determines whether the particular core logic design is to be applied immediately as a part of routine 510*a*—an "eager protocol." If the protocol for the given instance IID is of the eager type, as tested by conditional 520*a*, then routine 510*a* continues with stage 522*a* to apply the corresponding core logic design. Routine 510*a* then returns to process 210 to await the next operation. Likewise, if the test of conditional 520*a* is negative—that is the protocol is not of the eager type, then the routine 510*a* returns directly to process 210 from the negative branch of conditional 520*a*.

Returning to conditional 514*a*, if the instance IID does not have priority for hardware execution, then routine 510*a* continues with stage 530*a*. In stage 530*a*, the input data that would have been processed by reconfigurable logic circuit 40 if instance IID did have priority, is instead provided to a software routine that emulates the corresponding core logic design ID. This input data may be stored in a corresponding software input buffer for the emulation routine. Next, conditional 532*a* is encountered which performs the same protocol test as conditional 520*a*. If the protocol is of the eager type as tested by conditional 532*a*, then the software emulation routine is applied in stage 534*a*. The Write(IID) routine 510 then returns. Likewise, if the protocol type is not of the eager type, then routine 510 returns directly from the negative branch of conditional 532*a*.

A Read(IID) function of operations block 232 is further described in connection with routine 510*b* detailed in the flow chart of FIG. 8. Read(IID) routine 510*b* is performed to obtain output data relating to the processing of data previously input through the performance of one or more Write (IID) functions in accordance with routine 510*a*. Likewise, a Read(IID) function is only performed after the corresponding instance IID has been instantiated. From the designation in stage 512*b*, routine 510*b* continues with conditional 514*b*. Conditional 514*b* performs the same test as conditional 514*a* of routine 510*a*, regarding whether the particular core logic design IID has priority for execution by the hardware of reconfigurable logic circuit 40. If the core logic design instance IID does have priority as tested by conditional 514*b*, routine 510*b* continues with conditional 516*b*, which tests whether the corresponding core logic design ID is loaded in programmable logic 50. If the core logic design specified by ID is not loaded, operation 518b is engaged which waits until the appropriate core logic design specified by ID is switched into the programmable logic 50 in accordance with the scheduler routine of logic interface program 122. Typically this wait is for the next context switch. Routine 510*b* then resumes with conditional 520*b*. If the test of conditional 516*a* is affirmative, that is the desired core logic design ID is already loaded in programmable logic 50, then routine 510*a* proceeds directly to conditional 520*b* from the affirmative branch of conditional 516*b*.

Conditional 520*b* provides the same protocol test as conditionals 520*a*, 532*a* of routine 510*a* to determine-if the instance IID is of the eager type. If the given instance ID is not of the eager type, then stage 522*b* is encountered which applies the corresponding core logic design. Routine 510*b* continues at stage 540*b*. If instance IID is of the eager type as tested by conditional 520*b*, then routine 510*b* proceeds directly from the affirmative branch of conditional 520*b* to stage 540*b*. In stage 540*b*, the processed output data is pulled from the corresponding output buffer of interface buffers 68 by interface program 122 via device driver routine 124 to be returned to the corresponding application program 112.

Returning to conditional 514*b*, if the instance ID does not have priority for hardware execution, then routine 510*b* continues with conditional 532*b*, which performs the same protocol test as conditional 520*b*. If the test of conditional 532*b* is negative, that is a noneager instance IID, then routine 510*b* continues with stage 534*b* to apply the emulation software. Routine proceeds from stage 534*b* to stage 542*b* to provide the output data to the requesting application program 112 produced by the software routine emulating the core logic design. If the test of conditional 532*b* is affirmative, that is the instance IID is eager, then routine 510*b* proceeds directly from the affirmative branch of routine 532*b* to stage 542*b*. Routine 510*b* returns to process 210 after performance of stage 542*b*.

Figure 7:
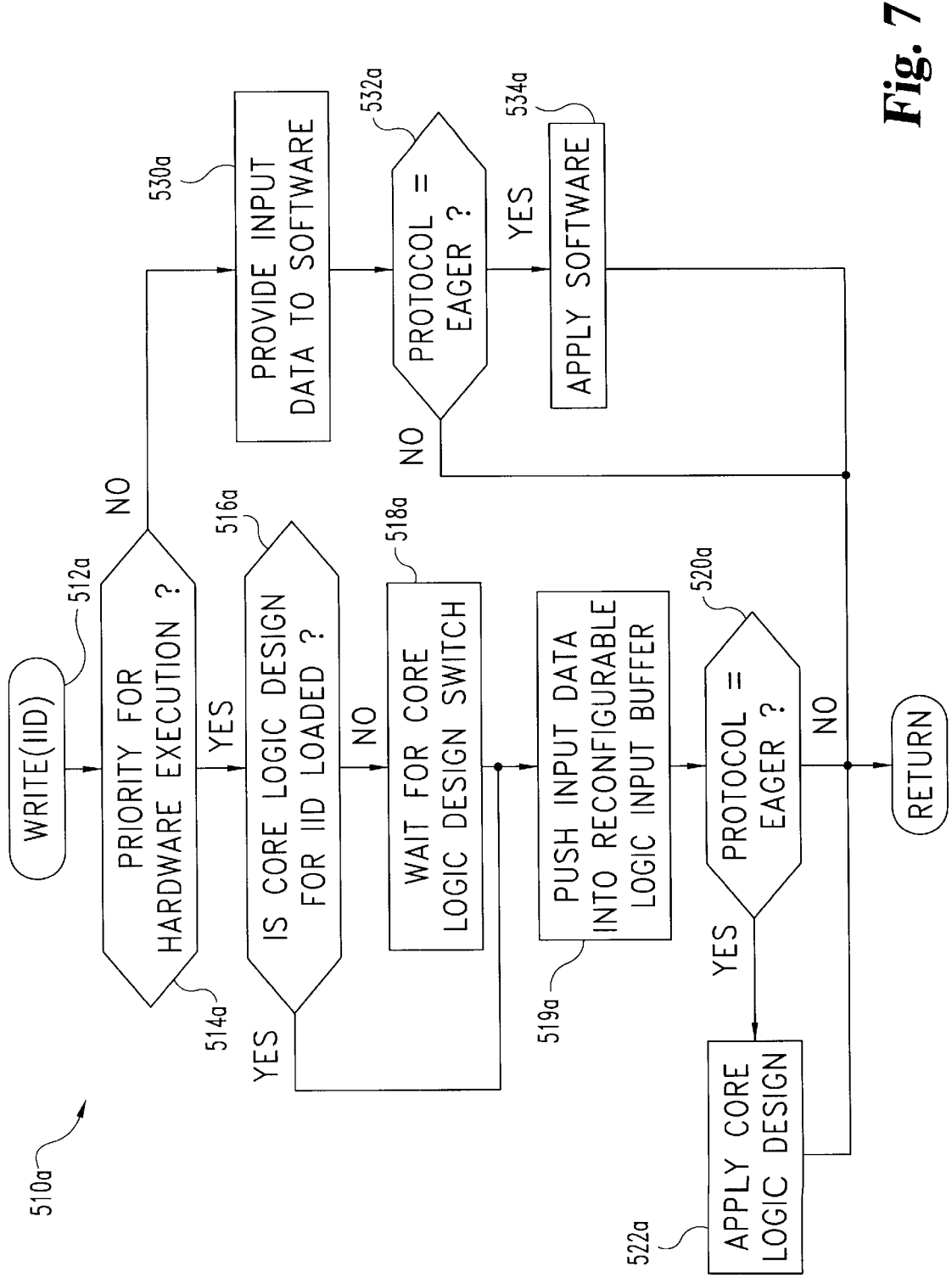
FIG. 7 is a flow chart showing further details of a "Write" routine for the process shown in FIG. 3.
Figure 8:
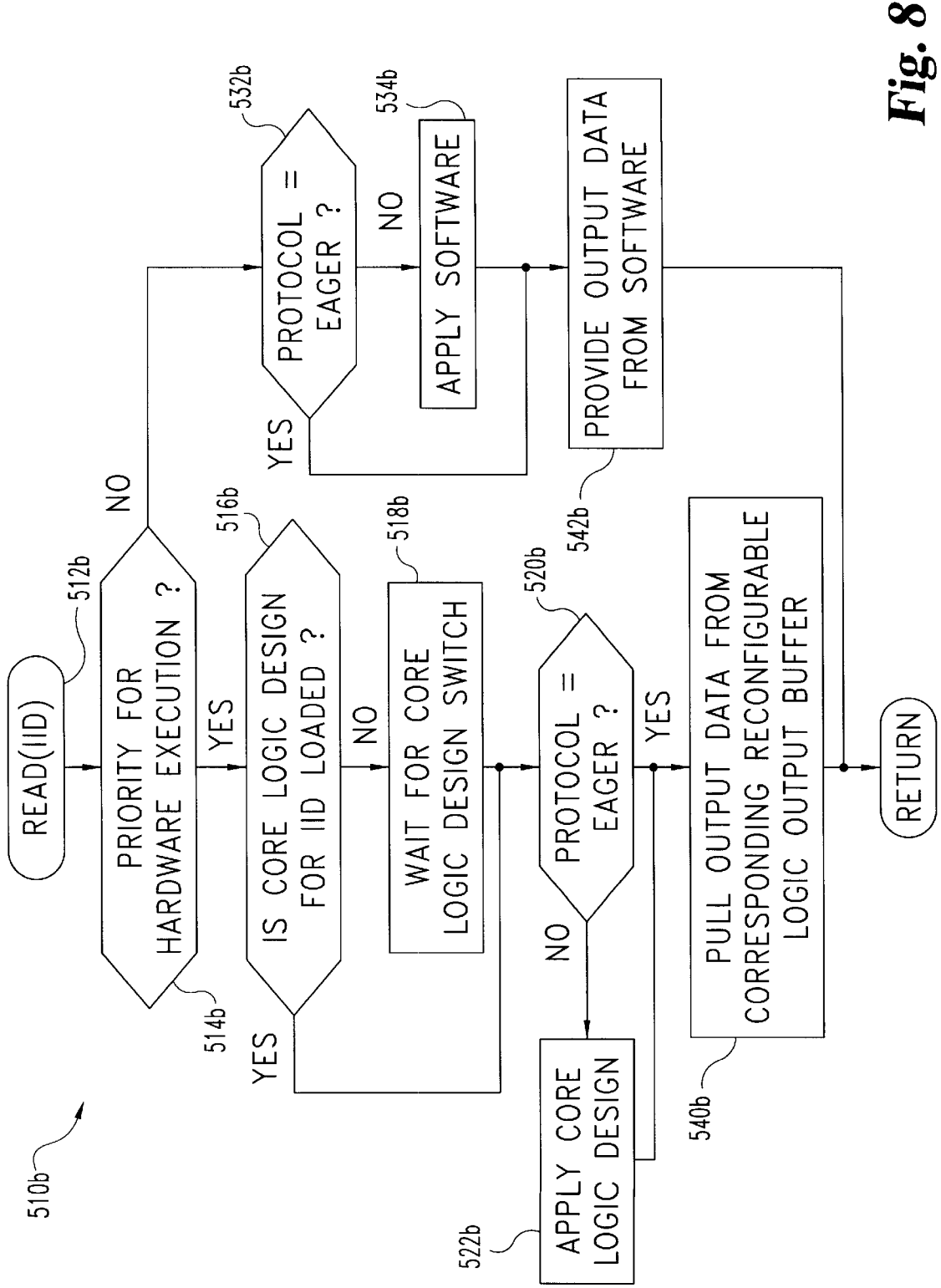
FIG. 8 is a flow chart showing further details of a "Read" routine for the process shown in FIG. 3.

Referring to both FIGS. 7 and 8, it should be understood that an instance IID of the eager type favors processing in stage 522*a* or 534*a* of the associated data input in stage 519*a* or 530*a*, respectively, as part of the performance of the Write(IID) routine 510*a*. Accordingly, because the data has already been processed, it need only be retrieved in the corresponding stages 540*b*, 542*b* of the Read(IID) routine 510*b*. In contrast, for a noneager type of instance IID, Write(IID) routine 510*a* inputs the data in the respective stage 519*a* or 530*a* without application. Instead, the Read (IID) routine 510*b* processes the input data in stage 522*b* or 534*b*, respectively.

Figure 9:
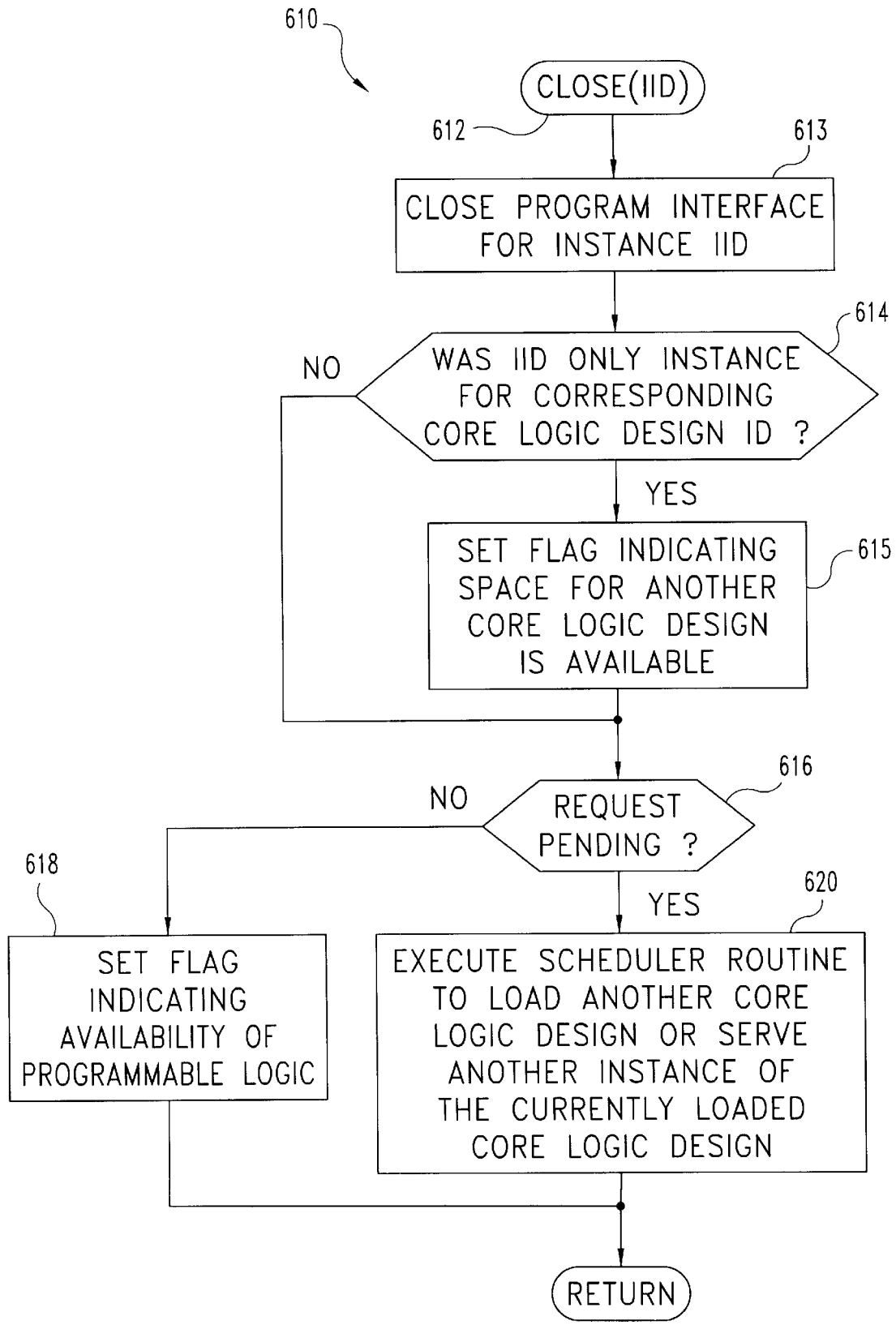
FIG. 9 is a flow chart showing further details of a "Close" routine for the process shown in FIG. 3.

The Close(IID) routine 610 is detailed in the flow chart of FIG. 9. It is performed to selectively close an open instance IID of logic design ID as established with the Open(ID) routine. From the identifier 612, routine 610 continues with stage 613. In stage 613, the core logic design instance IID is closed. Routine 610 resumes with conditional 614. In conditional 614, logic interface program 122 tests whether IID was the only instance of the corresponding core logic design ID. If it was the only instance, routine 610 continues with stage 615. In stage 615, a flag is set to indicate configurable logic 40 is free to accept another design. This flag can be read for conditional 314 and/or 316 of routine 310 to determine if a new logic design can be loaded. Routine 610 then proceeds from stage 625 or a negative result for conditional 614 to conditional 616 to determine whether there is a request pending to utilize programmable logic 50. Such requests are maintained as part of the scheduler routine for logic interface program 122. If there is not a pending request, stage 618 is engaged to set a flag indicating availability of programmable logic 50. This flag can be read when executing conditional 414 of routine 410 to determine if a logic design can be executed. If there is a request pending, stage 620 is engaged. In stage 620 logic interface program 122 executes its scheduler routine to load another core logic design into programmable logic 50 or serve another instance IID. From the execution of either stage 618 or 620 as determined by conditional 616, routine 610 halts and returns to operation 230 of process 210 as depicted in FIG. 3.

Figure 10:
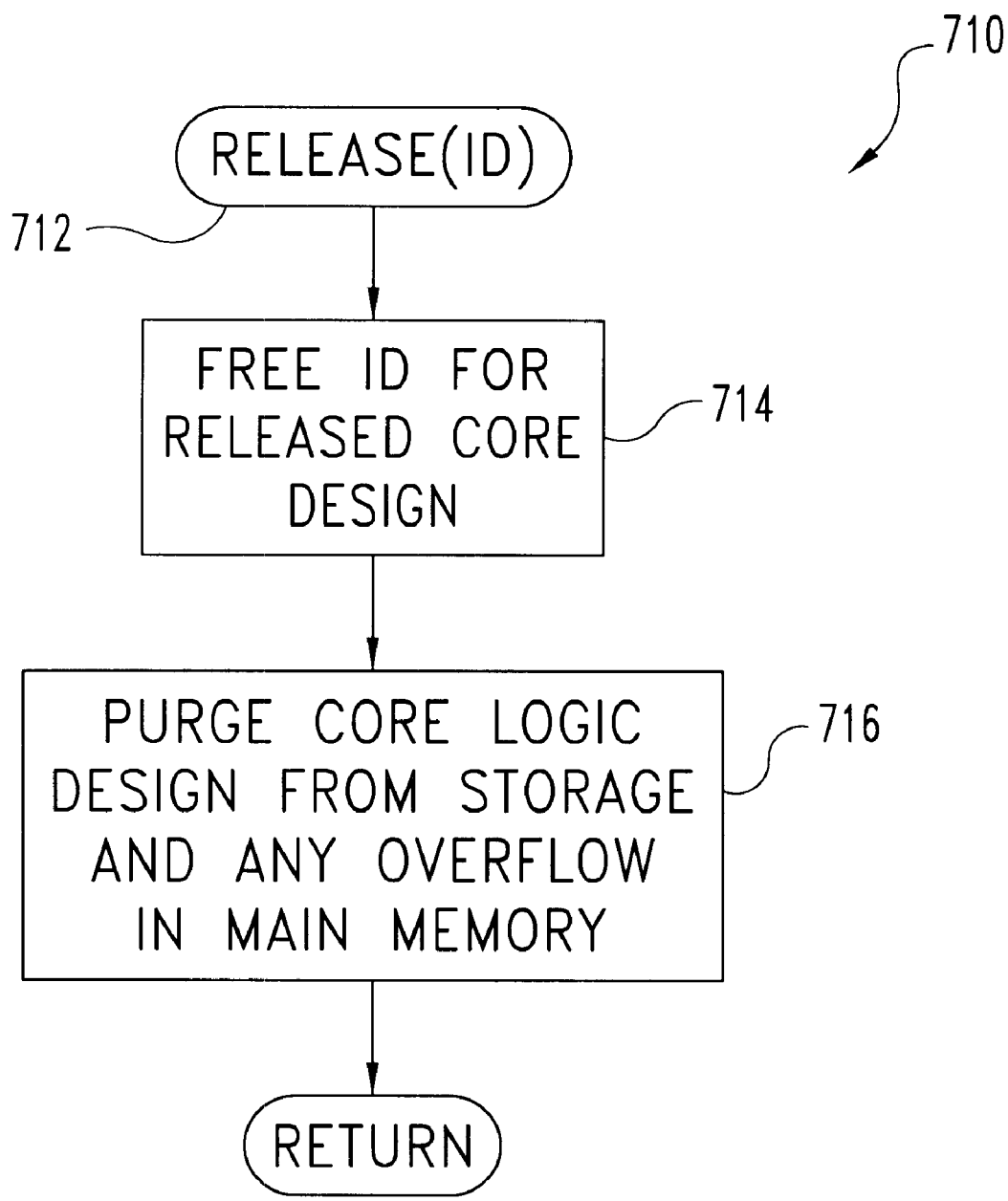
FIG. 10 is a flow chart showing further details of a "Release" routine for the process shown in FIG. 3.

The Release(ID) routine 710 of operations 232 is further detailed by the flow chart depicted in FIG. 10. Routine 710 is performed to release resources set aside for core logic design ID established with the Create(Core Design) routine 310, and requires that all instances IID for core logic design ID be closed first with the Close(IID) routine 610. From the identifier 712, routine 710 proceeds to stage 714 to free the core logic design identifier ID for use by a different core logic design. Routine 710 then proceeds to stage 716 to purge the released core logic design from storage in logic design memory 80 and any overflow space contained in main memory 28. This purge may be accomplished by marking the associated memory space to be overwritten by subsequent designs and/or to take action to erase logic design information. After stage 716, routine 710 halts, returning control to operation 230 of process 210. It should be appreciated that in other embodiments, the Close(IID) and Release(ID) operations may be combined into a single routine or function with or without other operations. In one form, all instances IID of the core logic design ID are closed and the core logic design memory space released in response to execution of this combined routine.

Figure 11:
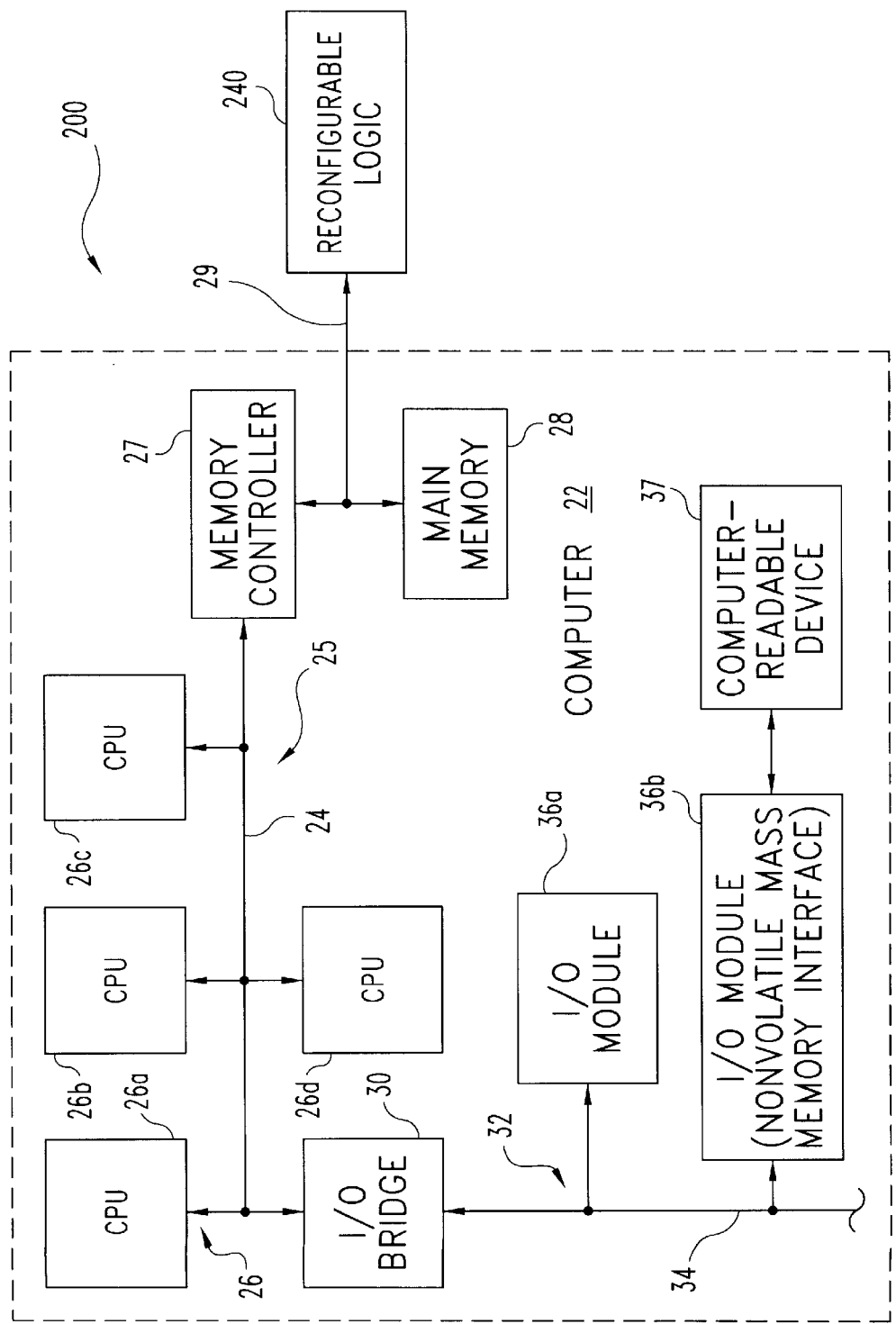
FIG. 11 is a diagrammatic view of another computing system with reconfigurable logic.

FIG. 11 illustrates processing system 200 of another embodiment of the present invention; where like reference numerals refer to like features of previously described embodiments. System 200 includes computer 22 as described in connection with FIG. 1. System 200 also includes reconfigurable logic circuit 240 operatively coupled to memory bus 29 for main memory 28. Reconfigurable logic circuit 240 can otherwise be configured the same as reconfigurable logic circuit 40 and correspondingly mapped as a memory space RL to communicate with one or more of processors 26.

Figure 12:
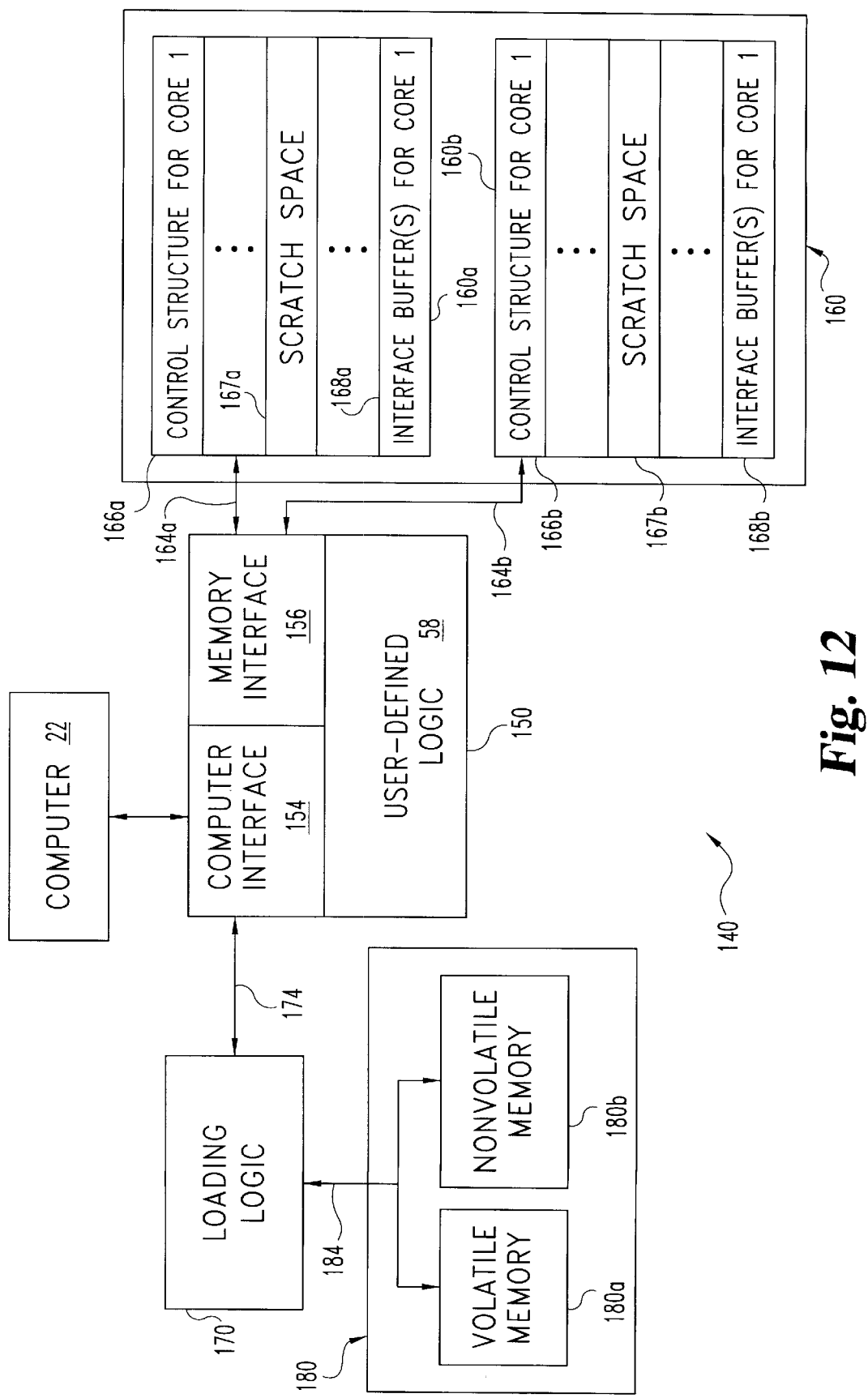
FIG. 12 is a diagrammatic view of another arrangement of reconfigurable logic.

FIG. 12 illustrates reconfigurable logic circuit 140 of another embodiment of the present invention; where like reference numerals represent like features of previously described embodiments. Reconfigurable logic circuit 140 is interchangeable with reconfigurable logic circuit 40 of system 20 and/or reconfigurable logic circuit 240 of system 200. Reconfigurable logic circuit 140 includes programmable logic 150 interfaced with computer 22; where such interface may be, for example, by coupling to processor bus 24 as in the case of system 20 or memory bus 29 as in the case of system 200. Programmable logic 150 includes computer interface logic 154, memory interface logic 156, and user-defined logic portion 58. Computer interface logic 154 is coupled to computer 22 by processor bus 24 and loading logic 170 by bus 174 in a manner analogous to that described for computer interface logic portion 54, bus 74, and design loading logic 70 of reconfigurable logic circuit 40.

Memory interface 156 is coupled to interface memory 160 by memory buses 164*a*, 164*b*. Interface memory 160 is comprised of two devices, memory device 160*a* and memory device 160*b*. Each of memory devices 160*a* and 160*b* include one or more corresponding control structures 166*a*, 166*b*, scratch space 167*a*, 167*b*, and interface buffers 168*a*, 168*b*, respectively. For the depicted example, memory device 160*a* stores control structure 166*a* and interface buffers 168*a* for a Core 1 logic design and memory device 160*b* stores control structure 166*b* and interface buffers 168*b* for a Core 2 logic design. Memory interface 156 is partitioned so that user-defined logic portion 158 can access one of the devices 160a, 160b on one of buses 164a, 164b (a local access mode), while computer 22 can access the other of the devices 160a, 160b on the other bus 164a, 164b (a remote access mode). For instance, during operation of programmable logic 50 while configured with the Core 1 design, user-defined logic portion 58 can locally access scratch space 167a, and/or interface buffers 168a; and computer 22 can remotely access device 160b simultaneously. Likewise during operation of programmable logic 150 with configured with the Core 2 logic design, user-defined logic portion 58 can locally access scratch space 167b and/or interface buffers 168b; and computer 22 can remotely access device 160a simultaneously.

This parallel access capability permits logic interface program 122 to send/receive interface information with respect to a first one of devices 160a, 160b while the executing user-defined logic portion 58 of programmable logic 50 utilizes the interface information and/or scratch space 167a, 167b of a second one of the devices 160a, 160b. Accordingly, greater efficiencies can be realized in comparison to a technique where access to the interface memory 60 by only computer 22 or user-defined logic portion 58 is permitted at a given time. Typically, remote access by computer 22 is given priority when both computer 22 and user-defined logic portion 58 are seeking access to one of devices 160a, 160b.

It should be understood, that multiple control structures and corresponding interface buffers for multiple instances may be stored in each memory device 160a, 160b. For such arrangements, context switching may be arranged to alternate between local and remote access modes for each device 160a, 160b. By way of nonlimiting example, for context switching between four different logic designs with the sequence Core 1 logic design, Core 2 logic design, Core 3 logic design, and Core 4 logic design; interface information for the Core 1 and Core 3 logic designs could be stored in memory device 160a and the interface information for the Core 2 and Core 4 logic designs could be stored in memory device 160b to provide the local/remote access alternation. Alternatively or additionally, more than two memory devices each having a separate access bus may be operated with local and remote access modes in correspondence with the particular core logic design being executed.

Computer interface logic 154 is also coupled to loading logic 170 via bus 174. Loading logic 170 is coupled to logic design memory 180 via bus 184. Logic design memory 180 includes one or more volatile memory devices 180a and one or more nonvolatile memory devices 180b. In one embodiment, the one or more nonvolatile memory devices 180b include at least one flash memory device for initial storage of core logic designs. The one or more volatile memory devices 180a can include Static Random Access Memory (SRAM), Dynamic Random Access Memory (DRAM), a combination of these, and/or such other type of memory as would occur to those skilled in the art. Because a limit typically exists regarding the number of times a flash memory of devices 180b may be rewritten, the one or more volatile devices 180a can serve as another means to store core logic designs; thereby reducing the likelihood of reaching such a limit. In one embodiment, volatile devices 180a are arranged to provide storage for core logic designs that are expected to change more frequently relative to core logic designs stored in nonvolatile devices 180b. Accordingly, logic interface program 122 and/or device driver routine 124 can be arranged to provide an option regarding the form of core logic design storage desired. Furthermore, it should be appreciated that SRAM and DRAM type devices 180a can often provide greater storage density than flash memory type devices 180b, facilitating more core logic design storage.

Referring generally to FIGS. 1–12, in other embodiments, memory 60, 160 and/or memory 80, 180 may be partially or completely provided by main memory 28 of computer 22. In still other embodiments, main memory 28 may not be utilized at all for overflow of reconfigurable logic circuit 40, 140, 240. Alternatively or additionally, reconfigurable logic circuit 40, 140, 240 may include programmable logic arranged to be simultaneously configured with two or more core logic designs and with one or more logic interface programs executed by computer 22 to control and interface with instances of such designs.

Because computer interface logic 54, 154 and memory interface logic 56, 156 are not likely to change frequently, it can completely or partially be stored in one or more flash memory devices and/or other nonvolatile type of memory devices that are separate from devices for storing core logic designs. In one alternative embodiment, some or all of computer interface logic 54, 154 and/or memory interface logic 56, 156 can be downloaded from computer 22 upon power-up. In another alternative embodiment, computer interface logic 54, 154 and/or memory interface logic 56, 156 is partially or completely provided in an Application Specific Integrated Circuit (ASIC), or other hardwired logic form, instead of being configured in programmable logic 50.

It should be understood that in an alternative embodiment, one or more reconfigurable logic circuits according to the present invention can be connected to processor bus 40 as described in connection with FIG. 1 and one or more other reconfigurable logic circuits according to the present invention can be connected to memory bus 29 as described in connection with FIG. 11. In yet other embodiments, one or more reconfigurable logic circuits according to the present invention can be configured as an I/O module either with or without other reconfigurable logic circuits that are connected to processor bus 24 and/or memory bus 29. Furthermore, a reconfigurable logic circuit of the present invention can be configured as an active bus agent—even emulating a processor in one or more respects—as opposed to a passive memory-mapped agent.

Many other embodiments of the present invention are envisioned. For example, in another embodiment, a system includes a digital processor bus operable to interconnect a process cluster, a reconfigurable logic device, a main memory, and one or more processors coupled together by the processor bus. At least one of the processors is operable to access the reconfigurable logic device. An input/output bridge is coupled to the processor bus and is also coupled to an input/output bus, that has a slower transmission clock speed than the processor bus.

In yet a further embodiment, an apparatus comprises a reconfigurable logic circuit configured with a computer interface. This circuit includes programmable logic, a first memory to dynamically store a number of logic designs each selected to configure the programmable logic, and a second memory to dynamically store interface control information for each of the logic designs. This information relates to one or more buffers allocated in the second memory for each of the logic designs. These buffers are provided to transmit data through the computer interface.

In still a further embodiment, a reconfigurable logic circuit includes programmable logic, design loading logic connected to the programmable logic, and one or more memory devices. These memory devices include a first memory space operable to store a number of logic designs for the programmable logic. The first memory space is accessible by the loading logic to selectively load one or more of the logic designs into the programmable logic. The memory devices also include a second memory space operable to store a number of interface control structures each corresponding to a different instance of one of the logic designs. The second memory space is accessible by the programmable logic.

Another embodiment includes operating a computer coupled to a reconfigurable logic circuit that has programmable logic, a first memory device, and a second memory device. This embodiment also includes storing first interface information in the first memory device for a first logic design and second interface information in the second memory for a second logic. design. Furthermore, it includes performing an operation with the programmable logic during configuration by the first logic design and accessing the first memory device with the programmable logic and the second memory device with the computer during performance.

For still another embodiment, a system includes a reconfigurable logic circuit and a computer. The reconfigurable logic circuit comprises programmable logic and a local memory that is operable to store interface information relating to a number of logic designs for the programmable logic. The computer is operatively coupled to the reconfigurable logic circuit and includes one or more processors and a main memory. The computer is operable to execute one or more application programs and a logic interface program. The one or more application programs are operable to generate a number of requests to utilize the reconfigurable logic circuit. The logic interface program is responsive to these requests to control application of the logic designs to the programmable logic. The logic interface program is operable to selectively allocate a memory space in the main memory for overflow of the local memory.

In yet another embodiment, a method comprises: executing at least one application program and a logic interface program on a computer coupled to a reconfigurable logic circuit that includes programmable logic and a local memory; storing several logic designs in the local memory with the logic interface program that are each operable to configure the programmable logic; operating two or more coexisting program interfaces between one or more of the application programs and the reconfigurable logic circuit with the interface program, where the program interfaces each correspond to a selected one of the logic designs; writing input data to the reconfigurable logic circuit for a selected one of the program interfaces; configuring the programmable logic with the selected one of the logic designs; processing the input data with the programmable logic after this configuration; reading output data from the reconfigurable logic circuit for the. selected program interface after this processing; closing the selected program interface after reading with the interface program, where other of the program interfaces remain open; and replacing a first one of the logic designs with a different logic design.

Another method of the present invention includes operating a computer coupled to programmable logic; concurrently executing two or more application programs with the computer that each generate at least one of a plurality of requests to utilize the programmable logic during execution; processing the requests with an interface program executed by the computer; and controlling the programmable logic with the interface program to reconfigure it a number of times during execution of the application programs in accordance with the requests.

An additional embodiment of the present invention includes a computer-readable device storing a number of instructions for execution by a computer coupled to a reconfigurable logic circuit that has programmable logic and a local memory to store a number of logic designs each operable to configure the programmable logic. The instructions are arranged to provide logic interface programs responsive to requests to utilize the reconfigurable logic circuit from a number of application programs being executed by the computer. The logic interface program includes a first routine executable a number of times to open a corresponding number of coexisting program interfaces between the application programs and the reconfigurable logic circuit. The program interfaces each provide for configuration of the programmable logic with a corresponding one of the logic designs stored with the first routine. Also included in this program is a second routine to provide input data to the reconfigurable logic circuit for a selected one of the program interfaces opened by the first routine for processing by the programmable logic. A third routine is also included to request output data from the reconfigurable logic circuit. The logic interface program also has a fourth routine to selectively close a specified one of the program interfaces established with the first routine.

All publications and patent applications cited in this specification are herein incorporated by reference as if each individual publication or patent application were specifically and individually indicated to be incorporated by reference. While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as defined by the following claims are desired to be protected.

What is claimed is:

1. A system comprising:
    a reconfigurable logic circuit including programmable logic, a first memory and a second memory, said first memory being arranged to store a number of logic designs each operable to configure said programmable logic;
    a computer coupled to said reconfigurable logic circuit, said computer being operable to concurrently execute one or more application programs and an interface program, the one or more application programs generating a number of requests to utilize said reconfigurable logic circuit, the interface program being responsive to the requests to open a number of coexisting program interfaces between the one or more application programs and said reconfigurable logic circuit, the program interfaces each corresponding to one of the logic designs stored in said first memory;
    wherein the reconfigurable logic circuit, in response to the interface program, provides a number of interface buffers in the second memory, each interface buffer corresponding to one of the program interfaces; and
    wherein each provided interface buffer is operable to store data passing between the computer and the reconfigurable logic circuit.

2. The system of claim 1, wherein said reconfigurable logic circuit includes design loading logic coupled between said programmable logic and said first memory to control loading of said programmable logic with any of the logic designs in accordance with the interface program.

3. The system of claim 1, wherein said reconfigurable logic circuit is a field programmable gate array configured to include a first portion with logic to interface with said computer, a second portion with logic to interface with said second memory, and a third portion to be variably configured in accordance with one of the logic designs.

4. The system of claim 1, wherein the second memory includes a first memory device with a first one of the interface buffers for a first one of the logic designs and a second memory device with a second one of the interface buffers for a second one of the logic designs, and said reconfigurable logic circuit provides for simultaneous access to said first memory device by said programmable logic and said second memory device by said computer during operation of said programmable logic in accordance with the first one of the logic designs.

5. The system of claim 1, wherein the interface buffers include an input buffer, an output buffer, and a state buffer for each of the interfaces.

6. The system of claim 1, wherein said computer includes one or more processors, a main memory, and an input/output bridge coupled together by a processor bus, said input/output bridge is coupled to an input/output bus having a bandwidth that is less than a bandwidth of said processor bus, and said programmable logic is connected to said processor bus and mapped to one or more memory locations accessible by the one or more processors.

7. The system of claim 6, wherein said interface program is operable to allocate an overflow memory space in said main memory to store interface information when said second memory is full.

8. A system, comprising:
a digital processor bus operable to interconnect a processor cluster;
a reconfigurable logic device;
a main memory;
one or more processors coupled to said reconfigurable logic device and said main memory by said processor bus, at least one of said one or more processors being operable to access said reconfigurable logic device;
an input/output bridge coupled to said processor bus;
an input/output bus coupled to said input/output bridge to isolate said input/output bus from said processor bus;
an input/output module coupled to said input/output bus; and
wherein at least one of said one or more processors transfers data to said reconfigurable logic device with a first latency time and to said input/output module with a second latency time, said second latency time being greater than said first latency time.

9. The system of claim 8, wherein said reconfigurable logic device includes programmable logic, a first memory to store a plurality of logic designs operable to configure said programmable logic, and a second memory operable to provide at least one interface buffer for each of the logic designs.

10. The system of claim 9, wherein:
said programmable logic includes a volatile field programmable gate array;
said reconfigurable logic device includes nonvolatile loading logic coupled between said programmable logic and said first memory to load said programmable logic with a selected one the logic designs; and
said programmable logic is programmed to include a first portion with logic to interface with said computer, a second portion with logic to interface with said second memory, and a third portion to be variably configured in accordance with the selected one of the logic designs.

11. The system of claim 8, wherein said at least one of the one or more processors is operable to access said reconfigurable logic device by mapping said reconfigurable logic device to one or more memory locations.

12. The system of claim 8, wherein said input/output bus is of a PCI type and said processor bus operates with a first bandwidth and said input/output bus operates with a second bandwidth less than said first bandwidth.

13. An apparatus, comprising: a reconfigurable logic circuit configured to communicate through a computer interface, said reconfigurable logic circuit including
programmable logic;
a first memory device operatively coupled to said programmable logic to store first interface information for a first logic design;
a second memory device operatively coupled to said programmable logic to store second interface information for a second logic design; and
memory interface logic operable to simultaneously provide local access to said first interface information in said first memory by said programmable logic and remote access to said second interface information in said second memory through said memory interface logic during configuration of said programmable logic with the first logic design, and change access modes to simultaneously provide local access to said second interface information in said second memory with said programmable logic and remote access to said first interface information in said first memory through said memory interface logic in response to configuring said programmable logic with said second logic design.

14. The apparatus of claim 13, wherein said memory interface logic is operable to provide priority to a remote access when in conflict with a local access by said programmable logic.

15. The apparatus of claim 13, wherein said memory interface logic is at least partially defined by said programmable logic and said first memory device is coupled to said memory interface logic by a first memory bus and said second memory device is coupled to said memory interface logic by a second memory bus.

16. The apparatus of claim 13, wherein said first memory device is arranged with a scratch space for selective access by said programmable logic and said first interface information includes a number of interface control structures, said interface control structures each including a pointer to an input buffer and an output buffer.

17. The apparatus of claim 13, further comprising a computer with one or more processors and a main memory coupled together by a processor cluster bus, said processor cluster bus being coupled to said reconfigurable logic circuit to provide the computer interface.

18. The apparatus of claim 13, wherein said reconfigurable logic circuit includes a nonvolatile memory to store a plurality of different logic designs and nonvolatile design loading logic, said loading logic being connected between said programmable logic and said nonvolatile memory to control loading of a designated one of the different logic designs.

19. An apparatus, comprising: a reconfigurable logic circuit configured with a computer interface, said reconfigurable logic circuit including
programmable logic;
a first memory to dynamically store a number of logic designs each selected to configure said programmable logic;

a second memory to dynamically store interface control information for each of the logic designs, the interface control information relating to one or more buffers allocated in said second memory for each of the logic designs to transmit data through said computer interface.

20. The apparatus of claim 19, wherein said second memory is further operable to store a scratch space accessible by said programmable logic.

21. The apparatus of claim 20, wherein the scratch space is dynamically allocated in said second memory in an address space between the interface control information for each of the logic designs and the one or more buffers for each of the logic designs.

22. The apparatus of claim 19, wherein the one or more buffers include an input buffer and an output buffer for each of the logic designs.

23. The apparatus of claim 22, wherein the interface control information for each of the logic designs includes a first pointer to the input buffer and second pointer to the output buffer, and data relating to size of each of the input buffer and the output buffer.

24. The apparatus of claim 19, wherein the interface control information includes data relating to time of last use of a respective one of the logic designs.

25. The apparatus of claim 24, wherein the interface control information includes a logic design identifier for the respective one of the logic designs.

26. The apparatus of claim 19, further comprising a computer with one or more processors and a main memory coupled together by a processor cluster bus, said processor cluster bus being coupled to said computer interface of said reconfigurable logic circuit.

27. The apparatus of claim 19, wherein said first memory is nonvolatile and said programmable logic includes a volatile field programmable gate array, and said reconfigurable logic circuit includes nonvolatile loading logic coupled between said programmable logic and said nonvolatile memory to control loading of a designated one of the logic designs.

28. An apparatus, comprising: a reconfigurable logic circuit including programmable logic, design loading logic connected to said programmable logic, and one or more memory devices including;

a first memory space operable to store a number of logic designs for said programmable logic, said first memory space being accessible by said loading logic to selectively load one or more of said logic designs into said programmable logic; and a second memory space operable to store a number of interface control structures each corresponding to a different instance of one of the logic designs, said second memory space being accessible by said programmable logic.

29. The apparatus of claim 28, wherein said one or more memory devices includes at least one nonvolatile memory device defining said first memory space.

30. The apparatus of claim 28, wherein said loading logic is coupled to said programmable logic and operable to load one or more of said logic designs from said first memory space into said programmable logic to configure said programmable logic with first interface logic and second interface logic.

31. The apparatus of claim 30, further comprising a computer with a processor bus coupled to said first interface logic and wherein said first interface logic and said loading logic cooperate to store one or more of the logic designs in said first memory space, and said second interface logic is operable to access said second memory space.

32. The apparatus of claim 28, wherein the interface control structures each include a data buffer.

33. The apparatus of claim 28, wherein the interface control structures each include an identifier for the one of the logic designs, a pointer to a buffer space, and data representative of time of last use of the one of the logic designs.

34. A method, comprising:

operating a computer coupled to a reconfigurable logic circuit, the reconfigurable logic circuit including programmable logic, a first memory device, and a second memory device;

storing first interface information in the first memory device for a first logic design and second interface information in the second memory for a second logic design;

providing simultaneous access to the first interface information by the programmable logic and the second interface information by the computer during operation of the programmable logic in accordance with the first logic design; and providing simultaneous access to the second interface information by the programmable logic and the first interface information by the computer during operation of the programmable logic in accordance with the second logic design.

35. The method of claim 34, further comprising accessing the first memory device with the computer while the programmable logic is configured with the first logic design.

36. The method of claim 34, further comprising changing a mode of access to the first memory device and the second memory device in response to reconfiguration of the programmable logic.

37. The method of claim 34, wherein the first interface information includes a first input buffer and a first output buffer and the second interface information includes a second input buffer and a second output buffer.

38. The method of claim 34, further comprising:

executing one or more application programs and an interface program on the computer; and establishing two coexisting program interfaces between the computer and the reconfigurable logic circuit with the interface program, a first one of the program interfaces being for the first logic design and a second one of the program interfaces being for the second logic design.

39. The method of claim 34, wherein the first interface information includes a control structure, a scratch space, a first interface buffer, and a second interface buffer and further comprising:

storing an identifier for the first logic design, a first pointer to the first interface buffer, a second pointer to the second interface buffer, data representing time of last use for the first logic design, and data relating to size of the first interface buffer and the second interface buffer in the control structure.

40. A system, comprising:

a reconfigurable logic circuit including programmable logic and a local memory, said local memory being operable to store interface information relating to a number of logic designs for said programmable logic;

a computer coupled to said reconfigurable logic circuit, said computer including one or more processors and a main memory coupled to said one or more processors, said computer being operable to execute one or more application programs and a interface program, the one or more application programs being operable to generate a number of requests to utilize said reconfigurable logic circuit, the interface program being responsive to the requests to control application of the logic designs to said programmable logic, the interface program being operable to selectively allocate a memory space in said main memory for overflow of said local memory.

41. The system of claim 40, wherein said local memory includes one or more memory devices operable to store the interface information and one or more other memory devices operable to store the logic designs, the one or more other memory devices being nonvolatile.

42. The system of claim 41, wherein the interface program is operable to determine a least recently used one of the logic designs stored in said one or more other memory devices based on the interface information and selectively store said least recently used one of the logic designs in said memory space of said main memory to load a different logic design in said one or more other memory devices of said local memory.

43. The system of claim 41, wherein the reconfigurable logic circuit includes loading logic coupled between said one or more other memory devices and said programmable logic.

44. The system of claim 40, wherein the interface program is operable to establish a number of coexisting program interfaces in response to the requests, the program interfaces each corresponding to a different one of the logic designs.

45. The system of claim 40, wherein said computer includes a processor bus to couple said main memory and said one or more processors together, an input/output bridge coupled to said processor bus, and an input/output bus coupled to said input/output bridge.

46. The system of claim 40, wherein the interface information includes a number of interface buffers allocated in said local memory, and said interface program is operable to store data intended for one of said buffers in said memory space when the size of the one of the buffers is insufficient to receive the data.

47. A method, comprising:
executing at least one application program and an interface program on a computer coupled to a reconfigurable logic circuit including programmable logic and a local memory;
storing several logic designs in the local memory with the interface program, the logic designs each being operable to configure the programmable logic;
opening two or more coexisting program interfaces between the at least one application program and the reconfigurable logic circuit with the interface program after said storing, the program interfaces each corresponding to a selected one of the logic designs;
writing input data to the reconfigurable logic circuit for a selected one of the program interfaces;
configuring the programmable logic with the selected one of the logic designs;
processing the input data with the programmable logic after said configuring;
reading output data from the reconfigurable logic circuit for the selected one of the program interfaces after said processing;
closing the selected one of the program interfaces after said reading with the interface program, other of the program interfaces remaining open; and
replacing a first one of the logic designs with a different logic design.

48. The method of claim 47, wherein the computer includes a main memory and further comprising:
allocating a memory space in the main memory with the interface program;
determining a least recently used one of the logic designs stored in the local memory with the interface program; and
storing the least recently used one of the logic designs in the memory space to provide space in the local memory to load another logic design.

49. The method of claim 47, further comprising:
providing a request to the interface program to process data with a designated one of the logic designs; and
determining status of the request with the interface program; and
performing a software routine to emulate the designated one of the logic designs in response to a first status of the request; and
configuring the programmable logic with the designated one of the logic designs in response to a second status of the request.

50. The method of claim 47, wherein the selected one of the logic designs is the same for each of the program interfaces.

51. The method of claim 47, wherein the selected one of the logic designs is different for each of the program interfaces.

52. The method of claim 47, wherein the interface program includes a first routine to open a specified program interface, a second routine to write data to the reconfigurable logic circuit for the specified program interface, a third routine to read information from the reconfigurable logic circuit for the specified program interface, and a fourth routine to close the specified program interface.

53. The method of claim 52, wherein the interface program includes a fifth routine to provide a designated logic design to the reconfigurable logic circuit and a sixth routine to remove the designated logic design.

54. A method, comprising:
operating a computer coupled to programmable logic;
concurrently executing two or more application programs with the computer, the application programs each generating at least one of a plurality of requests to utilize the programmable logic device during said executing;
processing the requests of each of the application programs with an interface program executed by the computer; and
controlling the programmable logic with the interface program to reconfigure the programmable logic device a number of times during said executing in accordance with the requests.

55. The method of claim 54, establishing a number of coexisting program interfaces with the interface program in response to the requests, the program interfaces each corresponding to a designated one of a number of logic designs for the programmable logic.

56. The method of claim 55, wherein the computer is coupled to a reconfigurable logic circuit including the programmable logic and a local memory, and further comprising storing the logic designs in the local memory with the interface program.

57. The method of claim 54, wherein the interface program includes a first routine to open a specified program interface, a second routine to write data for the specified program interface, a third routine to read data for the specified program interface, and a fourth routine to close the specified program interface.

58. The method of claim 54, wherein the computer includes a main memory and the programmable logic is coupled to a local memory, and further comprising:

storing a number of logic designs in the local memory;

allocating a memory space in the main memory with the interface program;

determining a least recently used one of the logic designs stored in the local memory with the interface program; and storing the least recently used one of the logic designs in the memory space to provide space in the local memory to load another logic design.

59. The method of claim 54, further comprising:

determining status of one of the requests associated with a designated logic design; and performing a software routine to emulate the designated logic design in response to a first status of the one of the requests; and configuring the programmable logic with the designated logic design in response to a second status of the one of the requests.

60. The method of claim 54, wherein the programmable logic includes a field programmable gate array, the programmable logic is included in a reconfigurable logic circuit, and the reconfigurable logic circuit further includes a first memory operable to store interface information and a second memory operable to store a number of logic designs for the programmable logic.

61. A computer-readable device storing a number of instructions for execution by a computer coup led to a reconfigurable logic circuit, the reconfigurable logic circuit including programmable logic and a local memory to store a number of logic designs each operable to configure the programmable logic, the instructions being arranged to provide a interface program responsive to requests to utilize the reconfigurable logic circuit from a number of application programs executed by the computer, the interface program comprising:

a first routine executable a number of times to open a corresponding number of coexisting program interfaces between the application programs and the reconfigurable logic circuit, said program interfaces each providing for configuration of the programmable logic with a corresponding one of a number of instances of one or more of several logic designs;

a second routine to provide input data to the reconfigurable logic circuit for a selected one of said program interfaces opened by said first routine for processing by the programmable logic when configured with said corresponding one of said instances;

a third routine to request output data from the reconfigurable logic circuit for said selected one of said program interfaces, said output data being generated by the programmable logic when configured by said corresponding one of said instances; and a fourth routine to selectively close a specified one of said program interfaces established with said first routine, said fourth routine leaving other of said program interfaces open.

62. The device of claim 61, wherein the interface program further comprises a fifth routine to remove a designated one of said program interfaces established with said first routine.

63. The device of claim 62, wherein the interface program includes a sixth routine executed one or more times to store the logic designs.

64. The device of claim 61, wherein the interface program is operable to determine status of a request from one of the application programs to implement a designated one of the logic designs, to initiate execution of a software routine to emulate the designated one of the logic designs in response to a first status indication, and to initiate configuration of the programmable logic with the designated one of the logic designs in response to a second status indication.

65. The device of claim 61, wherein the computer includes a main memory and the interface program is operable to allocate and manage a memory space in the main memory for overflow from the local memory.

* * * * *

UNITED STATES PATENT AND TRADEMARK OFFICE
CERTIFICATE OF CORRECTION

PATENT NO.    : 6,438,737 B1
DATED         : August 20, 2002
INVENTOR(S)   : Morelli et al.

It is certified that error appears in the above-identified patent and that said Letters Patent is hereby corrected as shown below:

<u>Column 25,</u>
Line 35, delete "coup led" and insert -- coupled --.

Signed and Sealed this

Eighteenth Day of March, 2003

JAMES E. ROGAN
*Director of the United States Patent and Trademark Office*